(12) United States Patent
Lim et al.

(10) Patent No.: US 12,069,575 B2
(45) Date of Patent: *Aug. 20, 2024

(54) SENSING PROCEDURE

(71) Applicant: LG ELECTRONICS INC., Seoul (KR)

(72) Inventors: Dongguk Lim, Seoul (KR); Jeongki Kim, Seoul (KR); Jinsoo Choi, Seoul (KR); Insun Jang, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,562

(22) Filed: Oct. 6, 2023

(65) Prior Publication Data

US 2024/0073820 A1 Feb. 29, 2024

Related U.S. Application Data

(63) Continuation of application No. 18/266,801, filed as application No. PCT/KR2021/018878 on Dec. 13, 2021.

(60) Provisional application No. 63/257,587, filed on Oct. 20, 2021, provisional application No. 63/239,956, filed on Sep. 2, 2021, provisional application No. 63/124,100, filed on Dec. 11, 2020.

(51) Int. Cl.
| | | |
|---|---|---|
| H04W 52/02 | (2009.01) | |
| G01S 5/02 | (2010.01) | |
| H04W 48/14 | (2009.01) | |
| H04W 84/12 | (2009.01) | |

(52) U.S. Cl.
CPC ....... *H04W 52/0229* (2013.01); *G01S 5/0268* (2013.01); *H04W 48/14* (2013.01); *G01S 2205/02* (2020.05); *H04W 84/12* (2013.01)

(58) Field of Classification Search
CPC .. H04W 52/0229; H04W 48/14; H04W 84/12
See application file for complete search history.

(56) References Cited

FOREIGN PATENT DOCUMENTS

WO WO-2023224336 A1 * 11/2023

* cited by examiner

*Primary Examiner* — Mohammad S Anwar
(74) *Attorney, Agent, or Firm* — LEE, HONG, DEGERMAN, KANG & WAIMEY

(57) ABSTRACT

According to the present specification, when a non-AP STA initiates a sensing procedure such as a sensing measurement, an STA, such as an AP, which receives an initiation request of the non-AP STA, may execute a sensing procedure such as a sensing measurement, and transmit the sensing execution result to the non-AP STA.

8 Claims, 25 Drawing Sheets

FIG. 8

| L-STF | L-CEF | L-Header | EDMG-Header-A | EDMG-STF | EDMG-CEF |

FIG. 9

| L-STF | L-CEF | L-Header | EDMG-Header-A | EDMG-CEF |

FIG. 10

| L-STF | L-CEF | L-Header | EDMG-Header-A | EDMG-STF | EDMG-CEF | TRN |

FIG. 11

| L-STF | L-CEF | L-Header | EDMG-Header-A | EDMG-STF | TRN |

SENSING PROCEDURE

CROSS-REFERENCE TO RELATED APPLICATIONS

This application is a continuation of U.S. patent application Ser. No. 18/266,801, filed on Jun. 12, 2023, which is the National Stage filing under 35 U.S.C. 371 of International Application No. PCT/KR2021/018878, filed on Dec. 13, 2021, which claims the benefit of U.S. Provisional Application No. 63/124,100, filed on Dec. 11, 2020, 63/239,956, filed on Sep. 2, 2021, and 63/257,587, filed on Oct. 20, 2021, the contents of which are all incorporated by reference herein in their entireties.

TECHNICAL FIELD

The present disclosure relates to a wireless LAN system, and more particularly to a wireless LAN sensing procedure.

BACKGROUND

A wireless local area network (WLAN) has been improved in various ways. For example, IEEE 802.11bf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.11bf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies.

For example, the WLAN sensing proposed herein may be used to sense the movement or gesture of an object. Specifically, the WLAN STA may sense the movement or gesture of an object based on measurement results of various types of frames/packets designed for WLAN sensing.

SUMMARY

According to the present specification, when a non-AP STA initiates a sensing procedure such as a sensing measurement, an STA such as an AP that receives an initiation request from the non-AP STA may perform a sensing procedure such as a sensing measurement and transmit the result of the sensing to the non-AP STA.

Advantageous Effects

The present disclosure proposes an improved sensing procedure. According to one embodiment of the present disclosure, when a non-AP STA initiates a sensing procedure, the power consumption of the non-AP STA can be reduced, and the complexity of performing the sensing procedure can be reduced.

BRIEF DESCRIPTION OF THE DRAWINGS

FIG. 8 shows an example of a sensing frame format.

FIG. 9 shows another example of a sensing frame format.

FIG. 10 shows yet another example of a sensing frame format.

FIG. 11 shows yet another example of a sensing frame format.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed WLAN sensing standard or IEEE 802.11bf standard.

Hereinafter, in order to describe a technical feature of the present specification, a technical feature applicable to the present specification will be described.

A WLAN sensing technology is a sort of radar technologies which can be implemented without a standard, but it is conceived that more powerful performance can be obtained through standardization. The IEEE 802.11bf standard defines an apparatus/device participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
| --- | --- |
| Sensing Initiator | apparatus/device initiating sensing |
| Sensing Responder | apparatus/device participating in sensing |
| Sensing Transmitter | apparatus/device transmitting sensing PPDU |
| Sensing Receiver | apparatus/device receiving sensing PPDU |

Figure 1:
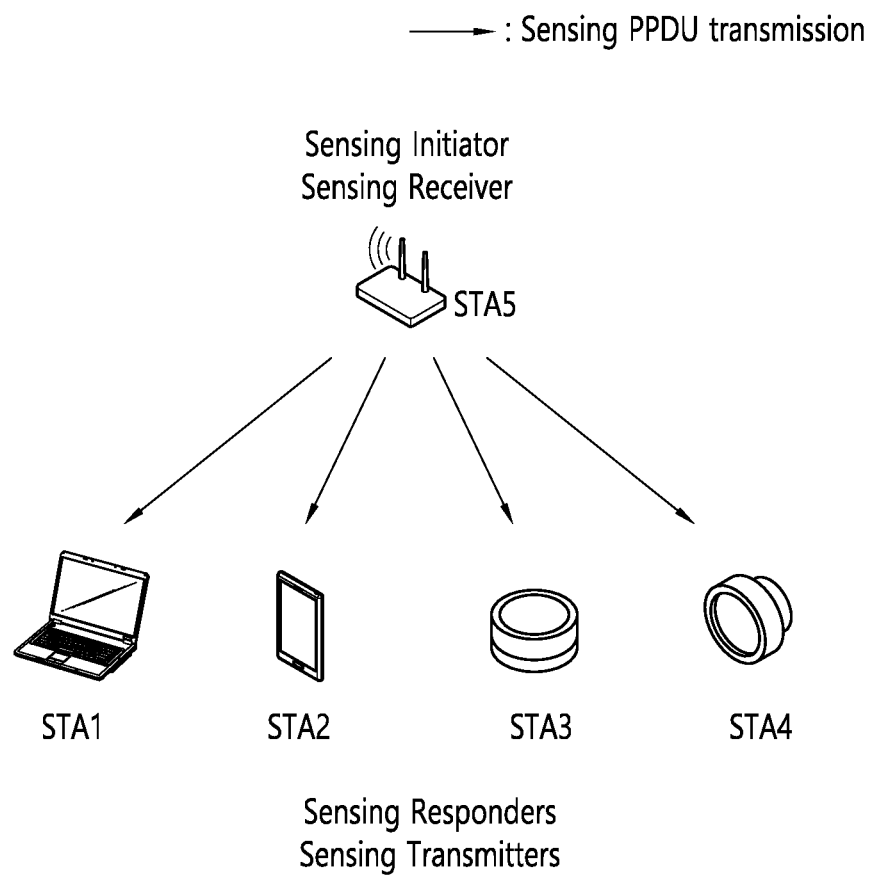
FIG. 1 shows an exemplary WLAN sensing scenario using multiple sensing transmitting devices.

FIG. 1 illustrates an example of a WLAN sensing scenario using multiple sensing transmitting apparatuses/devices.

Figure 2:
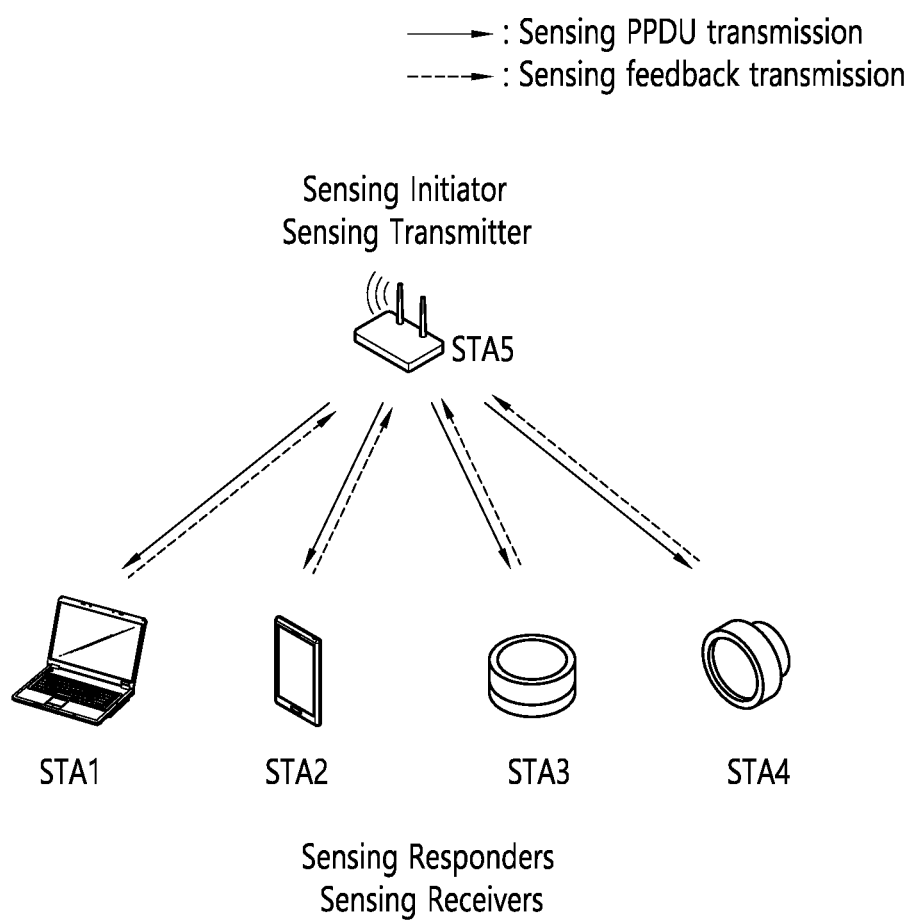
FIG. 2 shows an exemplary WLAN sensing scenario using multiple sensing receiving devices.

FIG. 2 illustrates an example of a WLAN sensing scenario using multiple sensing receiving apparatuses/devices.

FIG. 1 and FIG. 2 illustrate a sensing scenario based on a function and deployment of a WLAN sensing apparatus/device. In an environment assuming one sensing initiation apparatus and multiple sensing participating apparatuses, FIG. 1 is a scenario using multiple sensing PPDU transmitting apparatuses, and FIG. 2 is a scenario using multiple sensing PPDU receiving apparatuses. Assuming that the sensing PPDU receiving apparatus includes a sensing measurement signal processing apparatus, in case of FIG. 2, a procedure for transmitting (feeding back) a sensing measurement result to the sensing initiation apparatus (STA 5) is additionally required.

Figure 3:
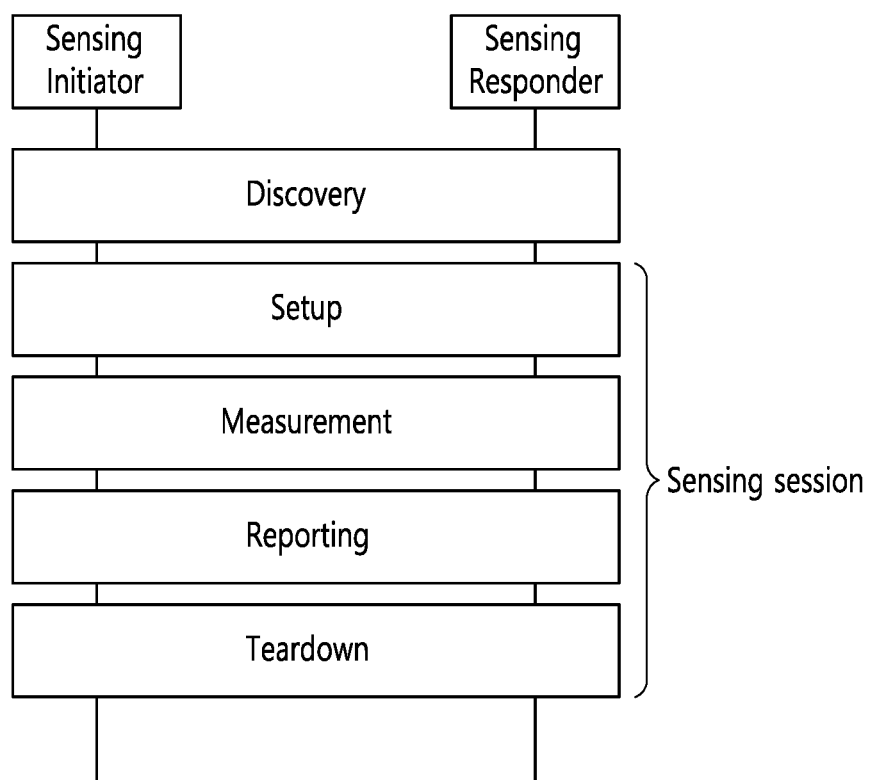
FIG. 3 shows an example of a WLAN sensing procedure.

FIG. 3 illustrates an example of a WLAN sensing procedure.

A procedure of WLAN sensing is performed as discovery, negotiation, measurement exchange, tear down, or the like between WLAN sensing initiation apparatus/device and participating apparatuses/devices. The discovery is a process of identifying sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear down is a process of terminating the sensing procedure.

Figure 4:
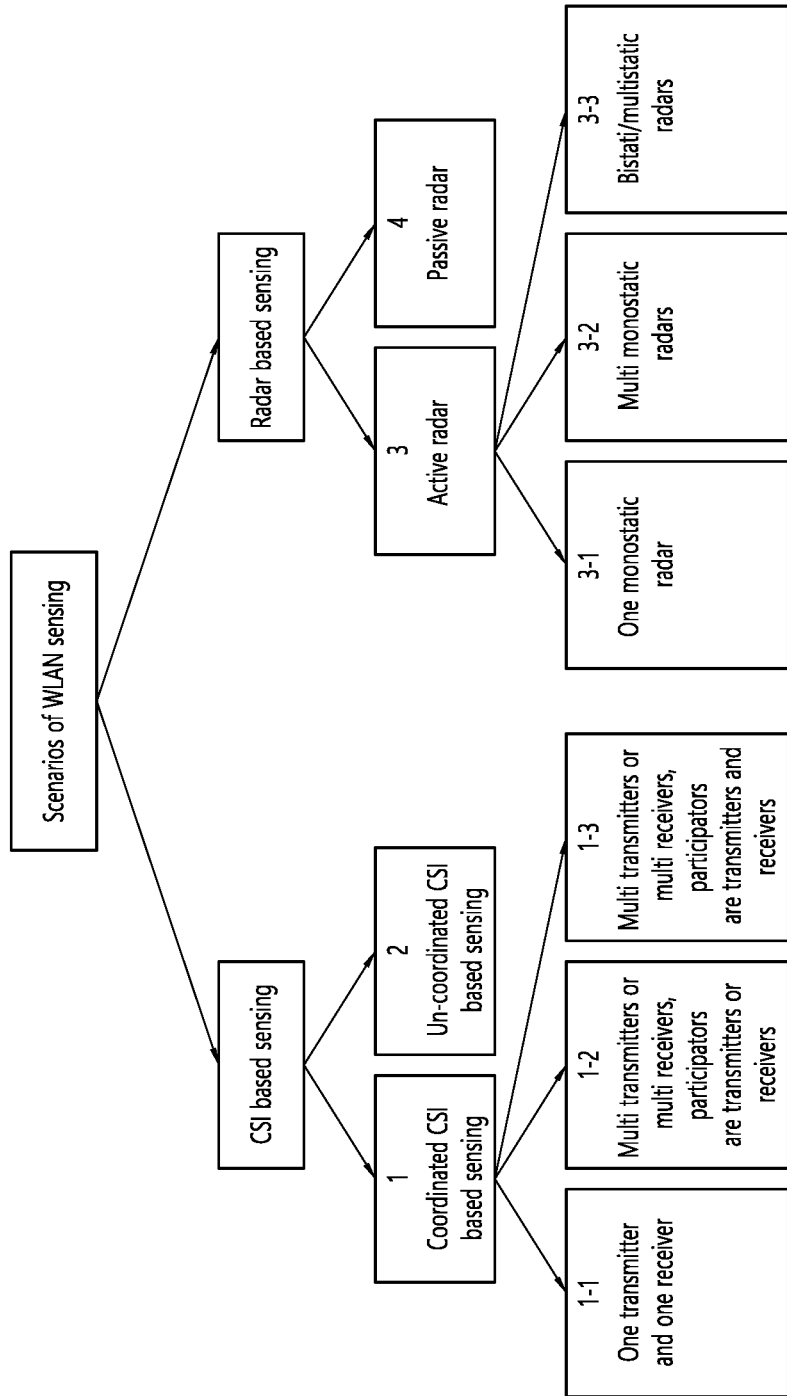
FIG. 4 is an exemplary classification of WLAN sensing.

FIG. 4 is an example of classifying WLAN sensing.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 5:
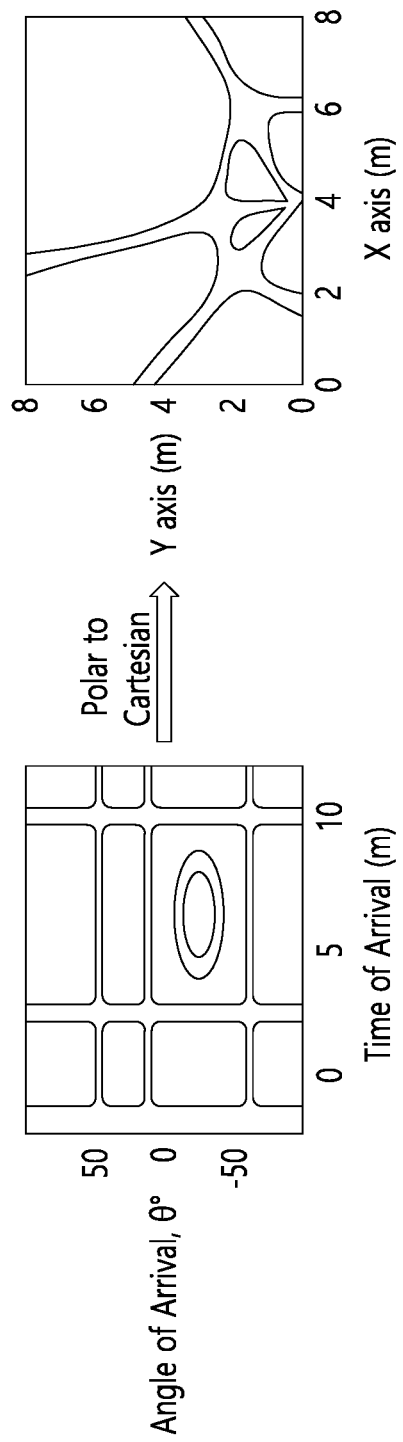
FIG. 5 shows indoor positioning using CSI-based WLAN sensing.

FIG. 5 illustrates indoor positioning which uses CSI-based WLAN sensing.

In FIG. 5, the CSI-based WLAN sensing is utilized in the indoor positioning. An angle of arrival and a time of arrival are obtained by using CSI, and then are converted into an orthogonal coordinate to obtain indoor positioning information.

Figure 6:
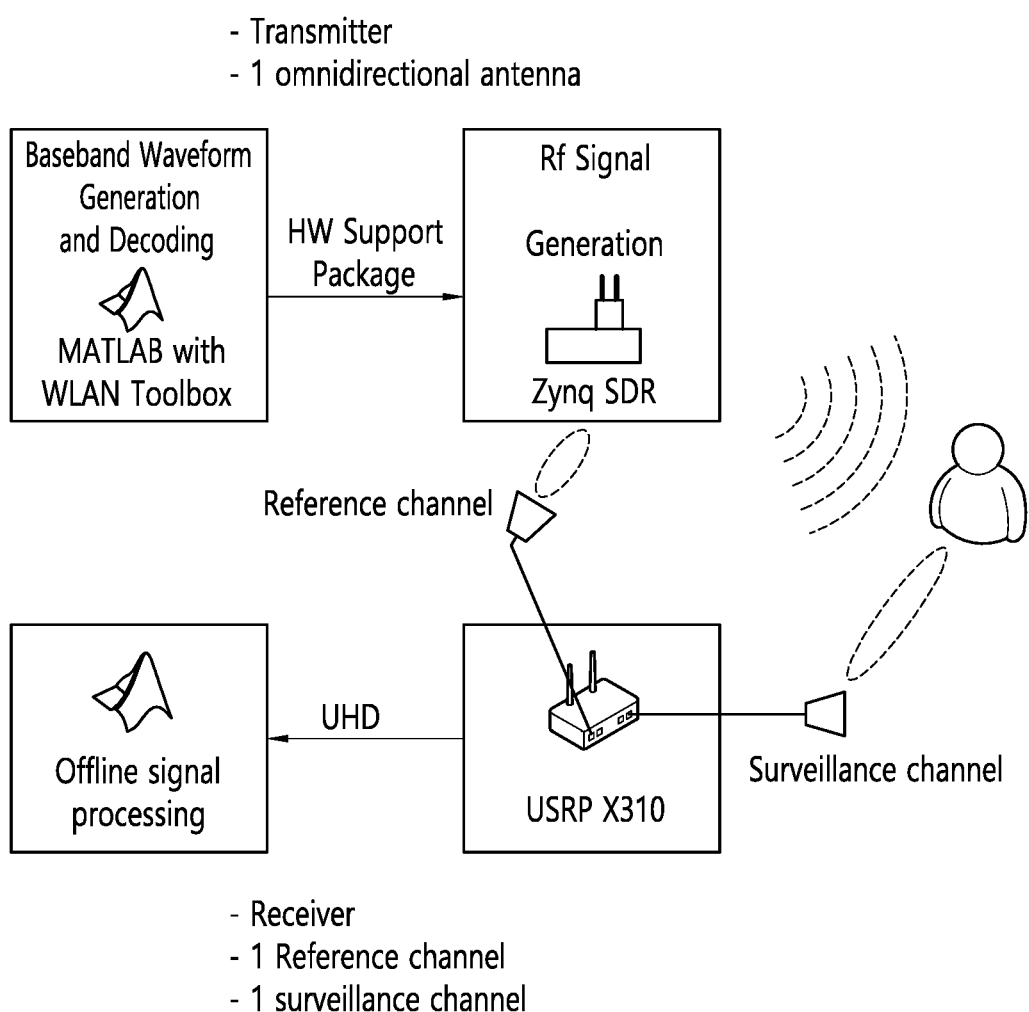
FIG. 6 is an exemplary implementation of a WLAN sensing device.

FIG. 6 is an example of implementing a WLAN sensing apparatus/device.

In FIG. 6, the WLAN sensing apparatus/device is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus/device, it is possible to obtain a unique feature capable of identifying a motion or a body action.

The IEEE 802.11bf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.11bf WLAN sensing is a sort of radar technologies using a WLAN signal which exists anywhere anytime. The following table shows a typical case of using IEEE 802.11bf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Identification of a gesture from a set of gestures - range >0.5 m | 2 | Gesture Detection | | | |
| Gesture recognition - large range (full body movement) | Identification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/detection aid | 3 | Fast detection of driver sleepiness | 0.01 | 1/0.1 | 3 |

In IEEE 802.11, a technology that is capable of sensing movement (or motion) or gesture of an object (person or object) by using Wi-fi signals of various bands is being discussed. For example, it is possible to sense the movement (or motion) or gesture of an object (person or object) by using Wi-fi signals (e.g., 802.11ad or 802.11 ay signals) of a 60 GHz band. Additionally, it is also possible to sense the movement (or motion) or gesture of an object (person or object) by using Wi-fi signals (e.g., 802.11ac, 802.11ax, 802.11be signals) of a sub-7 GHz band.

Hereinafter, technical characteristics of a PPDU according to the 802.11 ay standard, which is one of Wi-fi signals of the 60 GHz band that may be used for WLAN sensing, will be described in detail.

Figure 7:
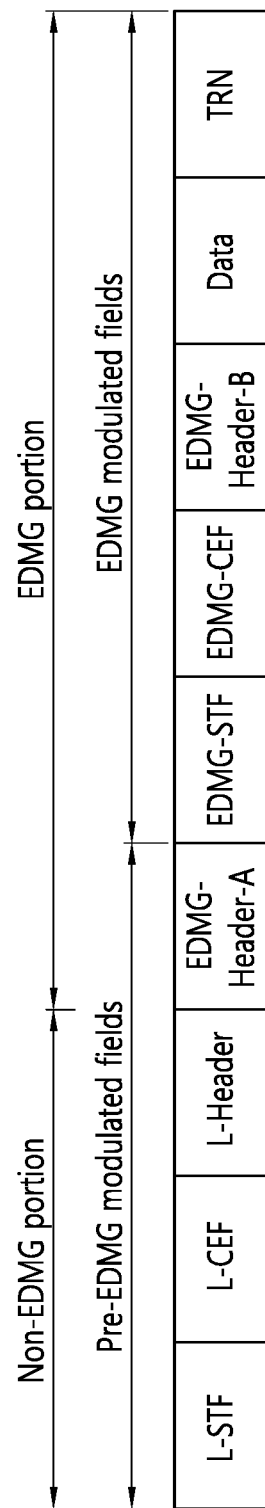
FIG. 7 is a diagram showing a simple PPDU structure that is supported in an 802.11ay WLAN system.

FIG. 7 briefly illustrates a PPDU structure supported in an 802.11ay WLAN system.

As shown in FIG. 7, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.).

Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields.

The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU.

A structure of EDMG-STF depends on the number of consecutive 2.16 GHz channels through which the EDMG PPDU is transmitted and an index iSTS of an isTs-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A structure of EDMG-CEF depends on the number of consecutive 2.16 GHz channels through which the EDMG PPDU is transmitted and the number of space-time streams iSTS. For single space-time stream EDMG PPDU transmission using the EDMG SC mode through one 2.16 GHz channel, an EDMG-CEF field does not exist. For EDMG SC transmission, the EDMG-CEF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Hereinafter, an example of a sensing frame format that is proposed for performing sensing at a 60 GHz band or WLAN sensing will be described in detail. A frame, packet, and/or data unit that is used for performing the sensing proposed in the present specification or the WLAN sensing may also be referred to as a sensing frame. The sensing frame may also be referred to by using other various terms, such as sensing measurement frame, sensing operation frame, and/or measurement frame, and so on.

FIG. 8 shows an example of a sensing frame format.

A Wi-Fi Sensing signal may be transmitted/received for channel estimation between an AP/STA and an STA by using a Wi-Fi signal of 60 GHz. At this point, in order to support backward capability with the existing 60 GHz Wi-Fi signal 802.11ad and 802.11ay, a sensing frame may be configured of a frame format that is shown in FIG. 8, which include a non-EDMG preamble portion (i.e., L-STF, L-CEF, L-Header).

As shown in FIG. 8, a sensing frame may be configured of L-STF, L-CEF, L-Header, EDMG-Header A, EDMG-STF, EDMG-CEF.

That is, since the sensing frame performs sensing on an STA or object by estimating a change in channel between Point to point (P2P) or point to multipoint (P2MP), unlike the conventional EDMG frame, the sensing frame may be configured without including a data field.

Since an EDMG frame may be transmitted by using one or more channels of a 60 GHz band (i.e., various channel bandwidths), as shown in FIG. 8, the sensing frame may be configured to include EDMG-STF and EDMG-CEF fields.

An STA/AP may perform accurate channel information measurement in a sensing transmission/reception bandwidth (BW) by using the EDMG-STF and EDMG-CEF fields.

Information on the BW that is used for the sensing may be transmitted through EDMG-header A. And, at this point, the corresponding information may be transmitted by using various BWs as shown below in the following table.

TABLE 3

| Index | BW |
|---|---|
| 1 | 2.16 GHz |
| 2 | 4.32 GHz |

TABLE 3-continued

| Index | BW |
| --- | --- |
| 3 | 6.48 GHz |
| 4 | 8.64 GHz |
| 5 | 2.16 + 2.16 GHz (non-contiguous) |
| 6 | 4.32 + 4.32 GHz (non-contiguous) |

Figure 9:
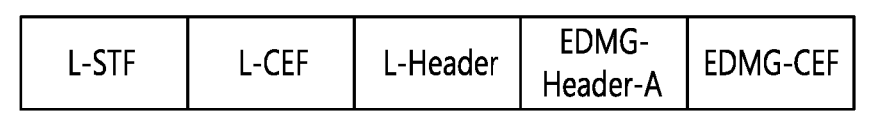

FIG. 9 shows another example of a sensing frame format.

Unlike what is described above, a sensing signal may be transmitted by using only a fixed BW (e.g., 2.16 GHz). And, in this case, since additional AGC, and so on, is/are not needed, the EDMG-STF may be omitted. When performing sensing by using only a predetermined BW, the EDMG-STF may be omitted, thereby configuring a sensing frame format, as shown in FIG. 9. Additionally, since only a predetermined BW is used, when performing sensing, unlike the conventional format, the EDMG-header may not include a BW field.

FIG. 10 shows yet another example of a sensing frame format.

At 60 GHz, an 802.11 ay transmission basically transmits a signal by using beamforming. And, at this point, in order to configure an optimal beam between Tx and Rx, an antenna weight vector (AWV) is configured by using a training (i.e., TRN) field. Therefore, since the sensing frame transmits a signal by using a predetermined AWV, it is difficult for the sensing frame to accurately apply the changed channel situation. Therefore, in order to more accurately measure any change in the channel, the sensing frame may be configured to include the TRN field, as shown below. At this point, the information on the channel may be measured through the TRN field.

In FIG. 10, the sensing frame does not include a data field, and since the sensing frame performs channel measurement for the sensing by using the TRN, the above-described EDMG-CEF field for performing channel estimation may be omitted. Therefore, the sensing frame format may be configured as described below in FIG. 11.

FIG. 11 shows yet another example of a sensing frame format.

Hereinafter, the technical characteristics of a PPDU according to a Wi-fi signal of sub-7 GHz that may be used for WLAN sensing will be described in detail.

Hereinafter, an example of a sensing frame format that is proposed for sensing in a sub-7 GHz band or WLAN sensing will be described. For example, for the sensing according to the present specification, various PPDUs of 2.4 GHz, 5 GHz, 6 GHz bands may be used. For example, PPDUs according to the IEEE 802.11ac, 802.11ax, and/or 802.11be standard(s) may be used as the sensing frame.

Figure 12:
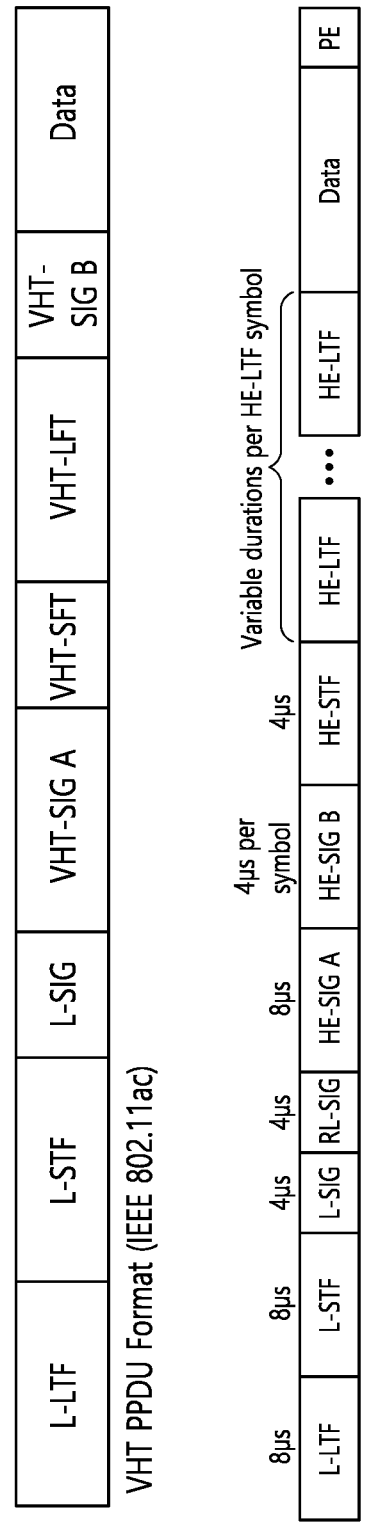
FIG. 12 shows another example of a sensing frame format.

FIG. 12 shows another example of a sensing frame format.

A sensing frame according to the present specification may use only part of the fields shown in FIG. 12. For example, a Data field shown in FIG. 12 may be omitted. Additionally, or alternatively, VHT-SIG B and/or HE-SIG B field(s) shown in FIG. 12 may be omitted.

Figure 13:
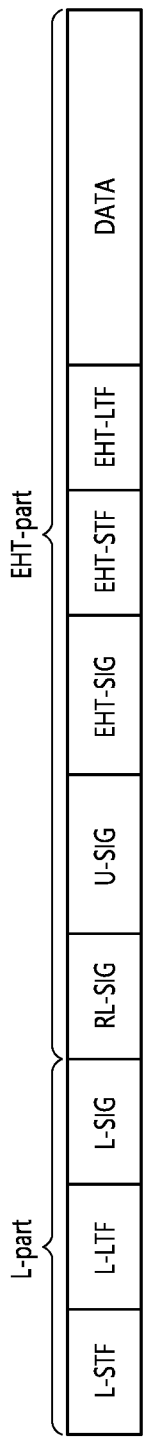
FIG. 13 shows another example of a sensing frame format.

FIG. 13 shows another example of a sensing frame format.

A sensing frame according to the present specification may use only part of the fields of an Extreme High Throughput (EHT) PPDU shown in FIG. 13. For example, a Data field shown in FIG. 13 may be omitted.

The PPDU of FIG. 13 may represent part or all of a PPDU type that is used in an EHT system. For example, the example of FIG. 13 may be used for both single-user (SU) mode and multi-user (MU) mode. In other words, the PPDU of FIG. 13 may be a PPDU for one receiving STA or a PPDU for multiple receiving STAs. When the PPDU of FIG. 13 is used for a Trigger-based (TB) mode, an EHT-SIG of FIG. 13 may be omitted. In other words, an STA that has received a Trigger frame for Uplink-MU (UL-MU) communication may transmit a PPDU, from which the EHT-SIG is omitted in the example of FIG. 13.

Subcarrier spacing of the L-LTF, L-STF, L-SIG, RL-SIG, U-SIG, and EHT-SIG fields of FIG. 13 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 13, L-LTF and L-STF may be the same as the fields of the prior art (or related art).

The L-SIG field of FIG. 13 may, for example, include 24 bits of bit information. For example, the 24-bit information may include a 4-bit Rate field, 1 Reserved bit, a 12-bit Length field, 1 bit of Parity bit, and 6 bits of Tail bits. For example, the 12-bit Length field may include information related to a PPDU length or time duration. For example, a value of the 12-bit Length field may be determined based on a type of the PPDU. For example, when the PPDU is a non-HT PPDU, an HT PPDU, a VHT PPDU, or an EHT PPDU, the value of the Length field may be determined as a multiple of 3. For example, when the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

The transmitting STA may generate an RL-SIG, which is generated identically as the L-SIG. The receiving STA may know that the received PPDU is an HE PPDU or EHT PPDU based on the presence (or existence) of an RL-SIG.

A Universal SIG (U-SIG) may be inserted after the RL-SIG of FIG. 13. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us. Each symbol of the U-SIG may be used for transmitting 26-bit information. For example, each symbol of the U-SIG may be transmitted/received based on 52 data tones and 4 pilot tones.

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 13 may include control information for the receiving STA. For example, the EHT-SIG may include a common field and a user-specific field. The common field may be omitted, and a number of user-specific fields may be determined based on a number of users. The common field may include RU allocation information. The RU allocation information may mean information related to the location of an RU to which multiple users (i.e., multiple receiving STAs) are allocated. The RU allocation information may be configured of 9-bit units. The user-specific field may include information for decoding at least one specified RU (e.g., STA ID information that is allocated to the corresponding RU, MCS index that is applied to the corresponding RU, LDPC/BCC coding type information that is applied to the corresponding RU, and so on) through the common field.

The EHT-STF of FIG. 13 may be used for enhancing automatic gain control estimation in a multiple input multiple output (MIMO) environment or OFDMA environment. And, the EHT-LTF of FIG. 13 may be used for estimating a channel in a MIMO environment or OFDMA environment.

Figure 14:
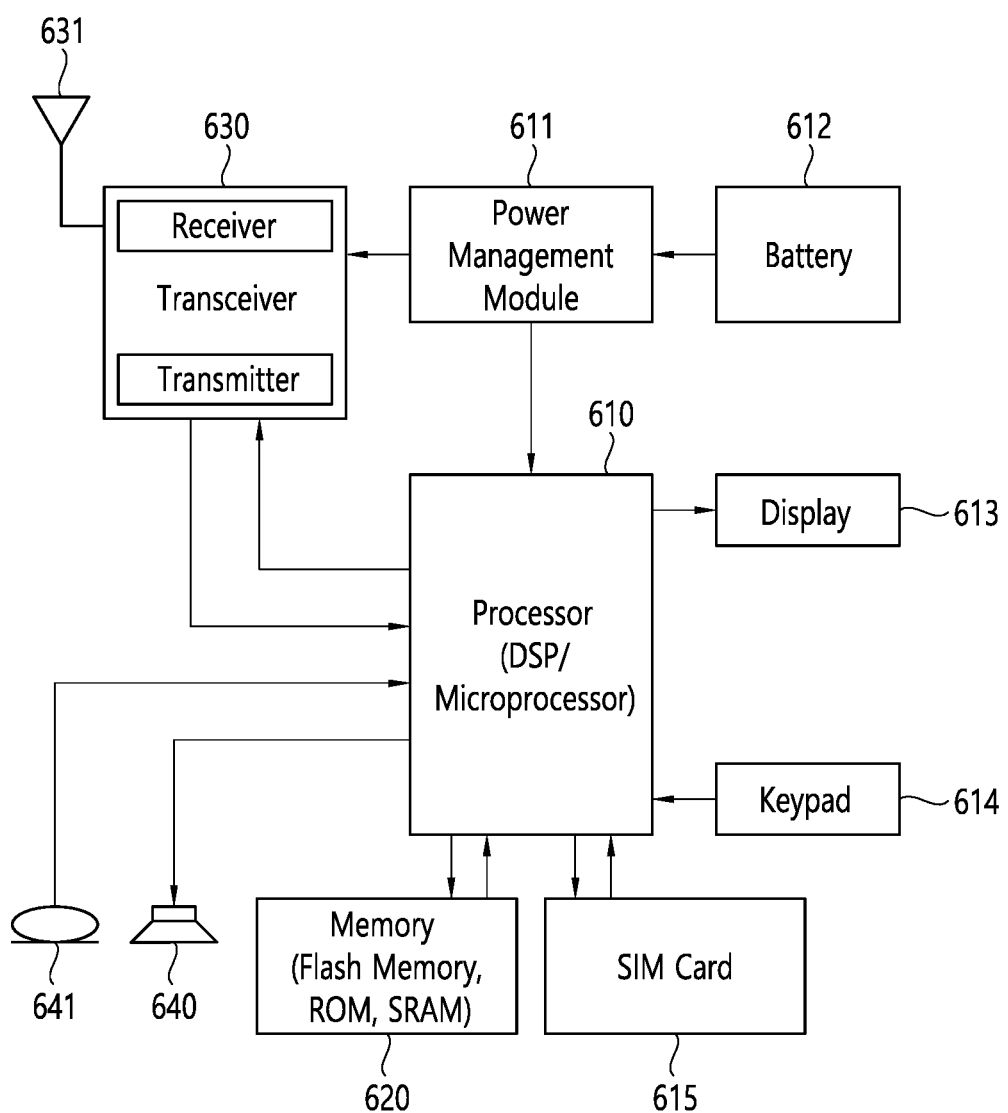
FIG. 14 shows a modified example of a transmitting device and/or receiving device of the present specification.

FIG. 14 shows a modified example of a transmitting device and/or receiving device of the present specification.

The device of FIG. 14 may be referred to by using other various terms, such as mobile terminal, wireless device, Wireless Transmit/Receive Unit (WTRU), User Equipment (UE), Mobile Station (MS), Mobile Subscriber Unit, or, simply, user, and so on. Additionally, the device of FIG. 14 may also be referred to by using other various terms, such as Base Station, Node-B, Access Point (AP), repeater, router, relay, and so on.

A processor 610 of FIG. 14 may instruct (or indicate) and control operations that are performed by the STA, transmitting STA, receiving STA, AP, non-AP, and/or user-STA according to the present specification. For example, the processor 610 may receive a signal from a transceiver 630, process the received signal (Rx signal), generate a transmission signal (Tx signal), and perform a control operation for transmitting the signal. The illustrated processor, memory, and transceiver may be implemented individually as separate chips, or at least two blocks/functions may be implemented through a single chip.

A memory 620 of FIG. 14 may store a signal that is received (i.e., Rx signal) through the transceiver 630 and may store a signal that is to be transmitted (i.e., Tx signal) through the transceiver 630. Additionally, the memory 620 of FIG. 14 may store a signal that is received (i.e., Rx signal) through the transceiver 630 and may store a signal that is to be transmitted (i.e., Tx signal) through the transceiver 630.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs that are to be used by the processor 610. The keypad 614 may be displayed on the display 613. A SIM card 615 may be an integrated circuit that is used to securely store an international mobile subscriber identity (IMSI) and its related key, which are used to identify and authenticate subscribers on mobile telephony devices, such as mobile phones and computers.

Referring to FIG. 14, a speaker 640 may output a result related to a sound processed by the processor 610. And, a microphone 641 may receive an input related to a sound that is to be used by the processor 610.

Hereinafter, the methods proposed herein are described.

To improve accuracy and increase resolution for WLAN sensing, WLAN sensing utilizing signal transmission and reception channels between multiple sensing STAs is contemplated. The sensing STAs may include STAs and APs. Therefore, in order to efficiently perform WLAN sensing using signal transmission and reception channels between a sensing initiator and a plurality of responders, channel estimation for each transmission and reception channel is required. In the present specification, a channel sounding method is proposed to efficiently perform channel measurement for multiple transmit and receive channels used for sensing.

In WLAN sensing, a sensing initiator (or an initiator) can measure the channel by using the transmission and reception channels with multiple responders (or a sensing responder). In this case, the sensing initiator can perform the sensing operation based on the following roles.

Role 1 (Initiator & Transmitter): When the sensing initiator plays the role of a transmitter that sends measurement frames for channel estimation to the sensing responder.

Role 2 (Initiator & Receiver): When performing the role of a receiver, which is responsible for requesting the transmission of measurement frames for channel estimation to the responder and receiving said frames.

Role 3 (only initiator): When performing only the initiation of sensing, i.e., the STA only sends a request for sensing, and the measurement for sensing can be accomplished through frame exchange between sensing responders. The above role may be established in consideration of collaboration or peer-to-peer (P2P) between devices.

As described above, the initiator may act in one of the three roles when performing the sensing operation. Further, indication for the roles may be transmitted to the sensing responders in the sensing negotiation phase or the measurement phase.

The indication for the role of the initiator may be transmitted via a sensing request/query frame or an initial sensing request frame, and may be transmitted using any of the following methods.

In one example, the indication may be configured as 1/2 bit.

In another example, the information may be indicated via a subfield such as initiator type or feedback report.

For example, if the indication is 1 bit, and the indication is transmitted via the initiator type subfield, the subfield may indicate a transmitter if the subfield indicates '0', and the subfield may indicate a receiver if the subfield indicates '1'.

As another example, if the indication is a 1-bit, when the indication is transmitted via a feedback report subfield, the subfield may indicate a receiver and no feedback is required if the subfield indicates '0', and the subfield may indicate a transmitter and feedback is required if the subfield indicates '1'.

The information based on the bit values is one example, and may be used differently from the above examples.

In another example, by transmitting a frame containing the above information, the initiator may indicate to the responder about its role in sensing or whether feedback is required.

In another example, two bits of information may be utilized to indicate different roles for the initiator and responder as described above.

In another example, the above information may be indicated via a sensing capability. In this case, the information may be configured as 1/2 bit.

For example, if the information is configured as 1 bit, the information may be indicated only to the transmitting or receiving role of the initiator. Alternatively, the information may be set to '0' if the initiator is acting as a transmitter and to '1' if the initiator is acting as a receiver.

In another example, if the information is configured as two bits, it may be configured as follows. First, the information may be configured as a bitmap. Specifically, the information may be configured as 'B0B1', where 'B0' represents information about the initiator/responder and 'B1' represents information about the transmitter/receiver. Here, 'B0' may be '0' to indicate an initiator and '1' to indicate a responder. Also, 'B1' can indicate a transmitter if it is '0' and a receiver if it is '1'. For example, if the initiator is a transmitter, the information may be set to [0 0]. Alternatively, the information may be configured as shown in the following table.

TABLE 4

| Value | Contents |
| --- | --- |
| 0 (00) | Initiator & Transmitter |
| 1 (01) | Initiator & Receiver |
| 2 (10) | Responder & Transmitter |
| 3 (11) | Responder & Receiver |

In another example, the information may be configured as three bits as follows. Specifically, the initiator may not have the roles of transmitter and receiver and may only perform sensing initiation. Further, an STA of one of the responders may act as the entity that performs the sensing measurement, i.e., the sensing owner. In view of this, the above 3 bits of information may be configured as follows.

TABLE 5

| Bit values | Contents |
| --- | --- |
| 0 | Initiator |
| 1 | Initiator & Transmitter |
| 2 | Initiator & Receiver |
| 3 | Responder & Transmitter |
| 4 | Responder & Receiver |
| 5 | Responder & Owner & Transmitter |
| 6 | Responder & Owner & Receiver |
| 7 | Reserved |

As described above, the initiator may transmit to the responder information about the capabilities of its role during sensing or information about whether it has received feedback.

Further, as described above, a responder that receives the initiator's information using the capability at the time of sensing or the feedback report field in the request/query frame may perform the following sounding procedure and sensing for channel estimation.

If the initiator's capability is set to transmitter or the feedback report field is set to a value or information that requires feedback when sensing is requested, channel estimation may be performed using the following sounding sequence.

If the initiator is acting as a transmitter, i.e., requesting feedback, then depending on the capabilities of the sensing STA, the sounding operation may be based on the following sounding sequence (or procedure).

Figure 15:
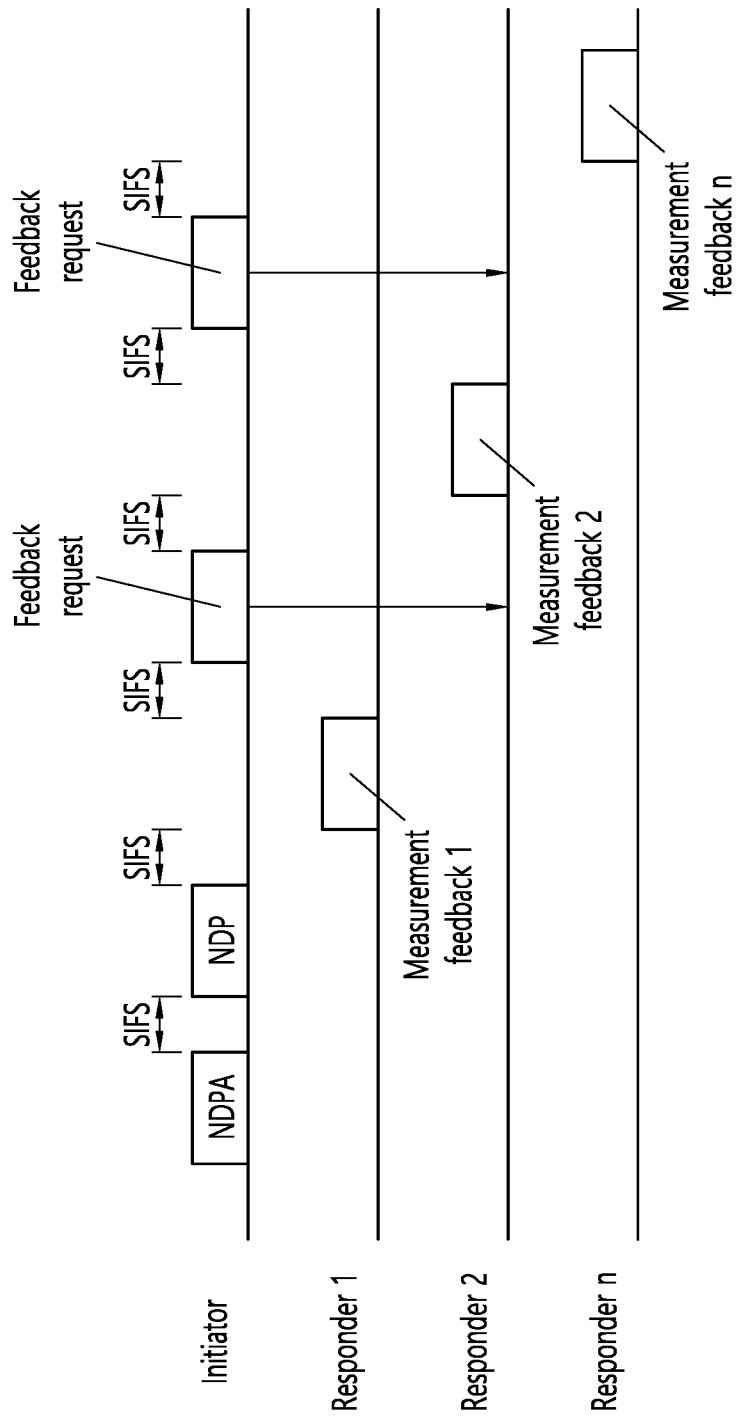
FIG. 15 is an example of a sensing procedure proposed herein.

1. Information related to the sounding capability of the sensing STA may be determined through the sensing negotiation procedure, or the STA initiating the sensing may transmit a sensing request/query frame containing such information to the STAs participating in the sensing. The information may be information indicating whether the sounding sequence used by the initiator for sensing is trigger based (TB) or non-TB.
2. Upon receipt of the sensing request/inquiry frame, the sensing STA may transmit information to the initiator in a response frame about whether or not it supports the request.
3. If the sensing STA has non-TB sounding capability, the following method/technical features may be applied. FIG. 15 is an example of a sensing procedure proposed in the present specification.
3. A. If the STAs performing sensing through negotiation or capability check do not support the TB, channel estimation can be performed using a non-TB sounding sequence as shown in FIG. 15.
3. B. The sensing initiator transmits a Null Data Packet Announcement (NDPA) to the sensing responders for channel measurement for sensing, and may transmit a Null Data Packet (NDP) after a short inter-frame space (SIFS) interval after the NDPA transmission.
3. B. i. The NDP may be transmitted using the VHT NDP frame.
3. B. ii. When transmitting the NDPA, the association identifier (AID)12 in the STA info subfield may be set as follows to indicate to the sensing STAs that the NDPA is for sensing.
3. B. ii. 1. The one most significant bit (MSB) of the AID12, 'B0', can be used to indicate whether the STA is an NDPA for sensing. If it is an NDPA for sensing, the bit may be set to '1'.
3. B. ii. 2. The AID12 may be configured as follows for sensing.
3. B. ii. A. The 'B0' may be used as a bit to indicate whether it is an NDPA for sensing.
3. B. ii. 2. B. In the AID12, B1 to B11, excluding B0, may indicate a STA ID.
3. B. ii. 3. By using the unused one MSB bit (B0) among the bits of AID12, the existing AID may be used without change.
3. B. ii. 4. The responders performing the sensing can determine through the received NDPA whether the sounding is for sensing.
3. B. iii. Unlike the above, a special user field for sensing indication may be placed/positioned at the beginning of the user field.
3. B. iii. 1. The AID of the special user field may be assigned an AID that is not assigned to the STA for sensing indication.
3. B. iii. 1. A. The AID may be set to one of the values 2008 to 2044 or 2047 to 4094.
3. B. iii. 2. Responders performing sensing via the AID in the special user field or the first user field may identify the sounding for sensing via the received NDPA.
3. C. After sending the NDPA, the initiator may transmit the NDP to the responders after the SIFS as shown in FIG. 15. Upon receiving the NDP, the responder may transmit the channel measurement information to the initiator after the SIFS after receiving the NDP.
3. C. i. For channel measurement feedback to each responder, the initiator may transmit a feedback request frame to each responder. At this time, a responder that receives the frame may transmit feedback after SIFS.
3. C. ii. As shown in FIG. 15, feedback requests and feedback are transmitted/performed at SIFS intervals, and requests/polls and feedback may be performed sequentially for responders participating in sensing.
3. D. To indicate the measurement performed as described above, the sounding dialog token included in the NDPA may be used to inform the responders, and the value of the sounding dialog token may be determined through the sensing negotiation/setup performed before the sensing measurement.
3. D. 1. During the sensing negotiation/setup, the initiator may transmit a sensing request frame or an initial sensing measurement frame to the responder. In this case, the frame may include sounding/sensing dialog token information for sensing measurement.

3. D. 1. A. The sounding dialog token information transmitted in the frame may be set to a sensing measurement setup ID or measurement ID field.

3. E. The channel measurement may be performed multiple times to the responders during the sensing operation. In this case, the value of the sounding/sensing dialog token transmitted via NDPA may be used to indicate each measurement.

3. E. i. The sounding dialog token information (or value) transmitted via NDPA may be determined by the value of the measurement setup ID or the measurement ID/measurement instant ID.

3. E. i. 1. In contrast to the above, the sounding dialog token information may be used as a measurement setup ID or a measurement ID/measurement instant ID.

3. E. ii. For channel measurement feedback to each responder when multiple measurements are performed using the sounding dialog token information transmitted via the NDPA, the initiator may transmit feedback request frames containing the sounding/sensing dialog token information to the responders.

3. E. ii. 1. The sounding/sensing dialog token information may represent a measurement setup ID or a measurement ID/measurement instant ID, or the ID may be used as the information.

3. E. ii. 2. Responders receiving the feedback request may feedback the measurement information corresponding to the sounding/sensing dialog token information after the SIFS. In this case, the feedback may include the sounding/sensing dialog token information received by the responder.

In one aspect, a measurement ID or a measurement instant ID in the present specification may be replaced by a measurement instance ID. Here, the measurement instance ID may be an identifier used in various phases of the WLAN sensing procedure. For example, the phases may include a polling phase, an NDPA sounding phase, a TF sounding phase, a reporting phase, a non-TB sensing measurement instance, and the like.

Figure 16:
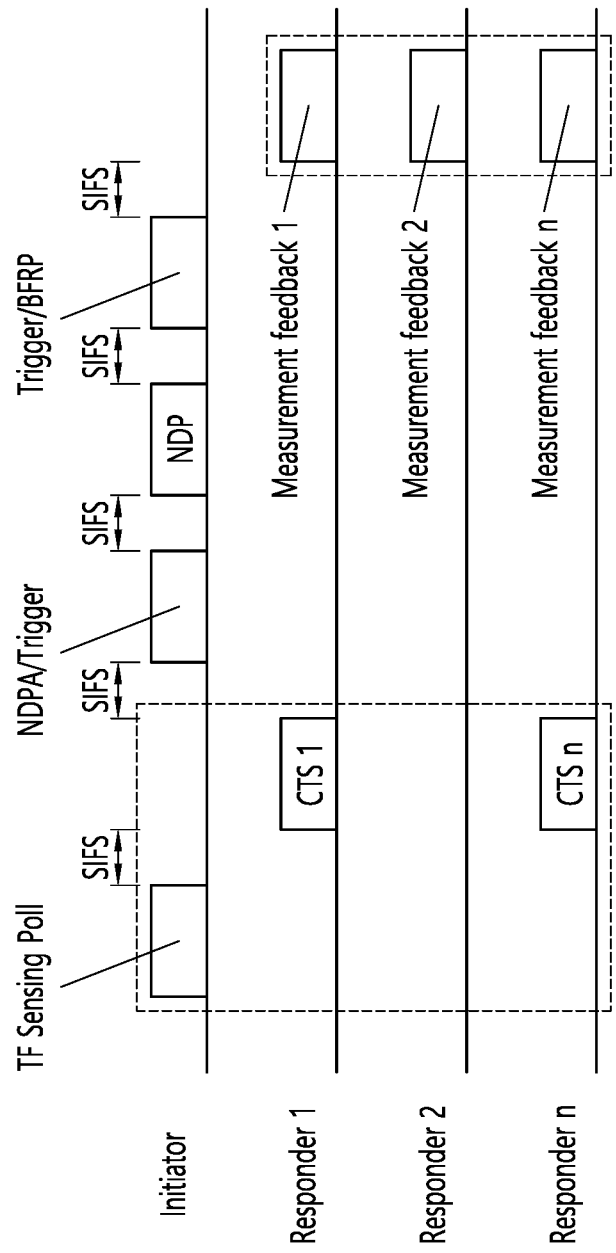
FIG. 16 is another example of a sensing procedure proposed herein.

4. If the sensing STA has TB sounding capability, the following methods/technical features may be applied. FIG. 16 is another example of a sensing procedure proposed herein.

4. 1. The initiator may transmit a sensing poll or a sensing request frame to the sensing STAs having the sensing capability identified through the negotiation process to determine whether they can perform sensing.

4. 1. A. The sensing request/poll or sensing trigger frame may include one or more of the following information.

4. 1. A. i. STA-ID: ID for the sensing STA.

4. 1. A. ii. spatial stream (SS) assignment: Information related to the spatial stream assigned to the STA at the time of sensing.

4. 1. A. iii. Bandwidth: The bandwidth over which sensing is performed 4. 1. A. iv. Resource unit (RU) allocation for response (CTS): RU information for transmitting a response frame to a poll frame or TB frame.

4. 1. A. iv. 1. The RU allocation information may be configured as an RU size of 20 MHz or more, i.e., 242 RUs or more.

4. 1. A. v. Sensing initial request or sensing starting indication 4. 1. A. vi. Sensing channel confirmation request 4. 1. A. vii. Whether to request sensing feedback 4. 1. A. viii. Sensing measurement ID or sensing measurement setup ID or dialog token information 4. 1. B. If a trigger frame is used for any of the above operations, the trigger frame may use one of the values from 9 to 15 that are reserved for indicating a sensing trigger. For example, if the trigger subtype field is set to 9, the trigger frame may indicate that it is a sensing trigger.

4. 2. The sensing STA receiving the sensing poll or sensing trigger frame may, after SIFS, transmit a response frame to the initiator in response to the frame.

4. 2. A. In this case, a 'CTS to self' frame may be used as the response frame.

4. 2. B. The response frame may be transmitted via TB PPDU (HE variant, EHT variant, or next generation) format.

4. 2. C. The response frame is transmitted using the RU information assigned via the poll frame/trigger frame.

4. 3. The initiator may identify the sensing STAs/sensing responders participating in the sensing measurement through the reception of the response frame to the transmission of the sensing poll or sensing trigger frame.

4. 3. A. To indicate that they intend to participate in sensing, sensing responders may set the sensing support field or sensing participating field to true, or set the field value to '1', in the response frame and transmit is to the initiator.

4. 3. B. The above subfields for sensing acknowledgments are just one example, other fields may be used for indications.

4. 4. The sensing poll may be performed for each sensing measurement phase. Alternatively, to reduce the latency of sensing and the air time for exchanging frames, the sensing poll may be performed every multiple sensing measurement phases.

4. 4. A. The responder may receive information about the performance of the sensing polls (e.g., frequency, duration, number of measurement phases, etc.) from the initiator through negotiation.

4. 5. The sensing initiator may transmit an NDPA to the sensing responders for the transmission of NDPs for channel estimation to the sensing responders for which it has been decided to perform a sensing measurement via the sensing poll.

4. 5. A. The NDPA transmitted by the initiator may include sensing indication information to indicate that it is an NDPA for sensing. This information may be contained in the common field of the NDPA or in the STA info subfield contained in the NDPA using a special AID.

4. 5. A. i. For example, when indicated using a special AID, the special AID for sensing may be set to one of the values from 2008 to 2044, which is the reserved value of AID11.

4. 5. A. ii. For example, the STA information subfield of the NDPA at the time of sensing may contain both the special AID and the STA ID.

4. 5. A. ii. 1. Here, if the AP is acting as a sensing responder, the AP may use one of the remaining reserved AID values, other than the above special AID, as the STA-ID for the AP.

4. 5. A. iii. As another example, a sensing special user field may be configured as described above.

- 4. 5. A. iii. 1. The special user field is located at the beginning of the user field and may also be indicated via an indication bit in the common field of the NDPA.
- 4. 5. A. iii. 2. The AID in the special user field may be assigned an AID that is not assigned to the STA to indicate sensing.
- 4. 5. A. iii. 3. The AID may be set to one of the values 2008 through 2044 or 2047 through 4094.
- 4. 5. A. iii. 4. Responders performing sensing via the AID in the first user field may identify the sounding for sensing via the NDPA received.
- 4. 5. B. Sensing responders can determine the information about the NDP being transmitted via the NDPA.
- 4. 5. B. i. For example, the NDPA may include bandwidth, LTF size and number of LTFs, number of spatial streams, reporting feedback information, etc.
- 4. 5. B. ii. The NDPA may include information about a measurement setup ID or a measurement ID/measurement instant ID. For example, this information may be obtained from the sounding/sensing dialog token information transmitted via the NDPA.
- 4. 6. The initiator may transmit a trigger frame or beam forming report poll (BFRP) to the sensing responder for channel estimation feedback over NDP after the SIFS interval following the NDP transmission.
- 4. 6. A. The trigger frame or BRFP for the feedback report may contain information for multiple responders.
- 4. 6. A. i. For example, the trigger frame may include the following information for each responder's feedback.
- 4. 6. A. i. 1. Information about the RU assignment
- 4. 6. A. i. 1. A. The information may include information about the RU used to perform the feedback on the measurement information.
- 4. 6. A. i. 2. Information about the spatial stream
- 4. 6. A. i. A. The information may include information about the number of allocated spatial streams and the starting point of the allocated spatial streams.
- 4. 6. A. i. 3. Information about the modulation and coding scheme (MCS)
- 4. 6. A. i. 3. A. The information may include information about the MCS used for feedback.
- 4. 6. A. i. 4. Information about the encoding
- 4. 6. A. i. 4. A. The information may include encoding information for the feedback information.
- 4. 6. A. i. 5. Feedback Information
- 4. 6. A. i. 5. A. The information may include information about the feedback type, e.g., signal to noise ratio (SNR), channel quality information (CQI), and angle.
- 4. 6. A. i. 5. B. Information about the resolution of feedback.
- 4. 6. A. i. 5. C. Codebook information, e.g. codebook size, etc.
- 4. 6. A. i. 6. Dialog token information
- 4. 6. A. i. 6. A. The above information may include dialog token information received via NDPA.
- 4. 6. A. i. 6. B. The information may be used as a measurement ID/measurement instant ID/measurement setup ID.
- 4. 6. A. i. 6. C. The field containing the above information may be represented, for example, by a measurement ID/measurement instant ID/measurement setup ID.
- 4. 7. Upon receiving a solicited frame for feedback (e.g., a trigger frame) from the initiator, the responder may transmit the measured information to the initiator using the information in the received frame.
- 4. 7. A. The feedback information may be transmitted to the initiator by multiple responders simultaneously using OFDMA or MU-MIMO.
- 4. 8. Here, the initiator may transmit an ACK to the responders after receiving the feedback.
- 4. 9. In the above measurement procedure, the IFS between each frame may be SIFS.
- 4. 10. The above procedure may reuse the sounding sequence of 802.11ax to reduce implementation difficulty and complexity.
- 4. 11. If NDPA is used as described above, it can only be applied to STAs that are associated with the BSS, so it may be difficult to perform the above procedure between STAs or when an AP is acting as a responder. Therefore, instead of the above NDPA, a trigger frame may be utilized to indicate the responders that an NDP is to be transmitted. The trigger frame may be used to indicate that an NDP is to be transmitted by the initiator, and to indicate this, a 'sensing' may be defined as a trigger type field. For this purpose, one of the values 9 through 15 of the reserved type field, e.g., 9, may be used to indicate a sensing trigger.
- 4. 11. A. The indication trigger for the above NDP transmission may be defined as a variant of the sensing trigger frame. Indication for this may be given using the sensing trigger subtype field.
- 4. 12. Since STAs participating in sensing have different sounding capabilities, STAs that do not support TB sounding sequences as described above may use VHT sounding sequences to measure channel information.
- 4. 12. A. Sensing Depending on the sounding capability of the STA, the STA's sounding procedure may be applied.

Figure 17:
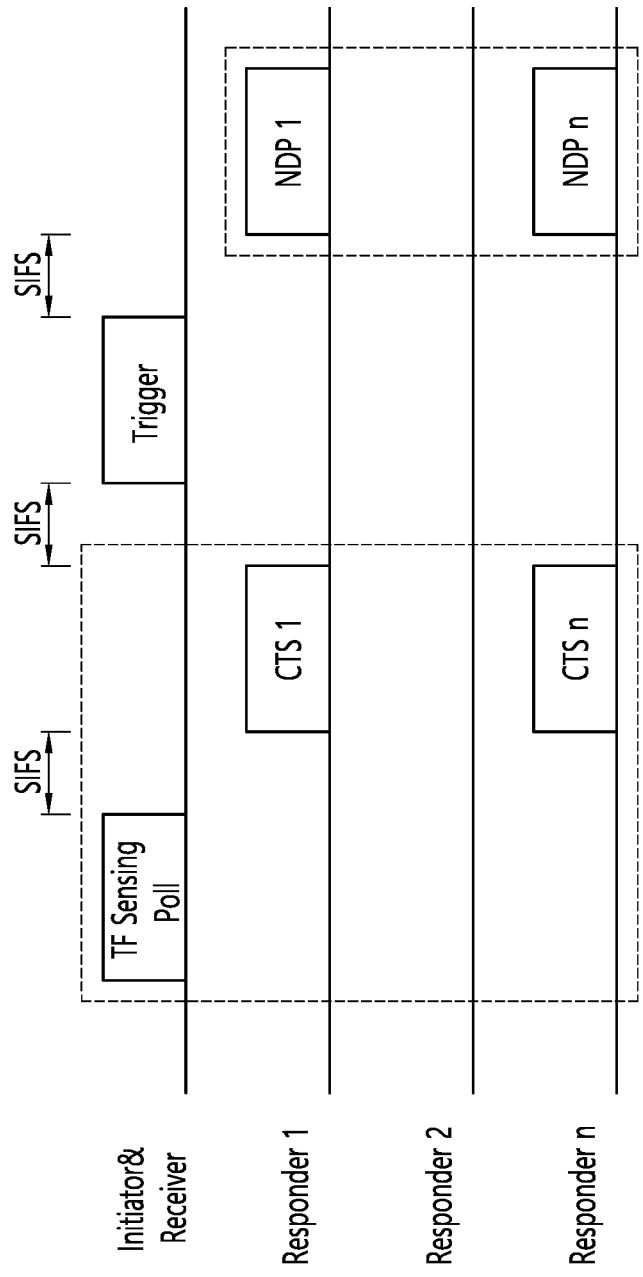
FIG. 17 is another example of a sensing procedure proposed herein.

In contrast to the above, if the initiator's capability is set to receiver or to values or information that do not require feedback reporting in a sensing request/query, the following sounding sequence may be used to estimate the channel. FIG. 17 is another example of a sensing procedure proposed herein.

The initiator may know a responder that has sensing capability through negotiation or a sensing initiation request & response, and may perform sensing by sending and receiving signals to and from the responder. At this time, the initiator may transmit a sensing request/query or a sensing poll or sensing trigger (the names of the frames are exemplary) to the sensing responder to perform channel measurements for sensing, as shown in FIG. 17.

- 1. A request/query or poll frame transmitted by the initiator to the responder prior to the measurement may comprise the following information. For example, the frame may be configured as in the sensing polling described in TB sounding sequence above.
- 1. A. STA-ID: Information about the identity of the sensing STA.
- 1. B. SS Assignment: Information about the space stream assigned to the STA at the time of sensing.
- 1. C. Bandwidth: Bandwidth over which sensing is performed
- 1. D. RU allocation for response (CTS): RU information for transmitting a response frame to a poll frame or TB frame
- 1. E. The above RU allocation may be configured as an RU size of 20 MHz or more, i.e. 242 RUs or more.
- 1. F. Sensing initial request or sensing starting
- 1. G. Sensing channel confirmation request
- 1. H. Whether to request sensing feedback 1. I. sensing measurement ID or sensing measurement setup ID or dialog token information
2. If a trigger frame is used for any of the above operation, the trigger frame may be one of the values from 9 to 15 reserved for indicating a sensing trigger. For example, a Trigger Subtype field set to 9 may indicate that the Trigger Frame is a sensing trigger.
2. A. The trigger frame may be defined as a variant of a sensing trigger frame.
3. Notwithstanding the foregoing, an RTS frame may be transmitted prior to the measurement phase to determine the status of the channel between the initiator and the responder.
4. Upon receipt of the frame from the initiator, the responder may confirm its participation in sensing and its availability on the channel, and transmit a 'CTS to self' or a sensing response frame to the initiator as described above.
4. A. When utilizing the 'CTS to self' frame as shown in FIG. 17, the 'CTS to self' frame defined in 802.11 may be reused without defining a new frame. Therefore, it may be easier to implement.
4. B. When sending a sensing response frame rather than a CTS frame, the frame allows the responder to indicate that it can perform sensing using the allocated channel.
4. B. i. A TB PPDU may be used as a response frame in the above.
5. The initiator can check the responders participating in the sensing and the channel status through the CTS frame or the sensing response frame received from the responders. At this time, the initiator may transmit a sensing NDP request or sensing sounding request frame or a trigger for NDP frame to the responders to request NDP transmission for the responders participating in sensing.
5. i. The trigger frame requesting the NDP transmission is set as a variant of a sensing trigger Frame and may be indicated via the Trigger Subtype field.
5. ii. The trigger frame may include a measurement identifier, wherein the information for the measurement identifier may be configured as sounding/sensing dialog token information.
5. ii. 1. The identifier may be used as a sensing measurement ID or a sensing measurement setup ID or a measurement ID.
5. B. In this case, the NDP transmitted by the responder may be transmitted based on RU information or channel information transmitted via a trigger frame to request the transmission of the NDP frame.
5. B. i. The NDP transmission request frame or the NDP request trigger frame may include bandwidth, preamble puncturing information, LTF size, and repetition information for transmitting the NDP.
5. B. ii. The use of a trigger frame for the above NDP request is one example, and a sensing NDP request or sensing sounding request frame may be defined for the NDP transmission request.
5. B. iii. The RU information and channel information may be the same as the RU or channel information assigned by the initiator to the responder to determine the availability of the sensing request or channel prior to the NDP transmission.
5. 6. Responders requested to transmit NDPs may use the assigned RU and channel to transmit NDPs to the initiator.
5. 7. Here, the interval between frames may be SIFS.

In another example, the sounding sequence for the case where the initiator initiates sensing without performing a channel measurement for sensing may be performed as follows: the initiator sends a request for a sensing operation to a specific STA or AP, and the specific STA or AP may perform the actual sensing operation. At this point, the initiator may receive feedback information about the sensing measurement, or may only be reported the final result of the sensing.

A. The sensing initiator may learn about STAs performing sensing through negotiation. Alternatively, the sensing initiator may receive information about STAs with sensing capabilities from the AP.

A. 1. Where the initiator is not the AP, the sensing initiating STA may request information about the sensing STAs from the AP. Upon receipt of the request frame, the AP may transmit a list or information about the STAs with sensing capabilities in the BSS to the requesting initiator STA.

A. 1. i. Here, the list of STAs with sensing capabilities transmitted by the AP may include the AP.

B. Upon receiving the information about the sensing STAs, the initiator may transmit a sensing measurement/sensing owner request frame to the sensing STAs to determine the specific sensing STAs to perform the sensing measurement.

B. 1. The specific sensing STA may refer to a sensing responder that initiates the TB sounding or non-TB sounding sequence/procedure described above. Here, the specific sensing STA may refer to an AP or non-AP STA.

B. 1. i. The request frame may include the following information.

B. 1. i. 1. RU assignment information for the response frame

B. 1. i. 2. Information about the sensing operation as an initiator

C. Upon receipt of a sensing measurement request frame from an initiator, a responder may inform the initiator via a response frame whether it can act as a sensing initiator.

C. 1. The response frame may be transmitted over differently assigned RU allocations.

D. The initiator may receive from the sensing responders, via a response frame, information related to whether they support being a sensing initiator & transmitter or a sensing initiator & receiver.

E. The initiator may determine a specific sensing STA by considering the information received and the transmission status with the initiator, and may transmit a sensing initiation frame to the determined STA to perform sensing.

E. 1. The sensing initiation frame may include the following information.

E. 1. i. TXOP or sensing operation duration

E. 1. ii. STA information for sensing responders

E. 1. iii. Sensing measurement request

E. 2. Upon receipt of the sensing initiation frame from the sensing initiator, the specific sensing STA may perform channel measurements using the sounding sequence for the aforementioned measurements, depending on the STA's capabilities and role, and report the measured results/feedback.

F. Unlike the above, the sensing initiator STA may transmit a request frame to the AP to determine whether it can act as a specific sensing STA, or the sensing initiator STA may transmit a sensing request frame to the AP to request a sensing operation. The request frame may be variously labeled. The request frame may contain information such as RU allocation for the aforementioned response frame, information about the sensing operation as an initiator, etc. The AP receiving the request frame may perform the sensing measurement procedure using non-TB sounding or TB sounding as described above after transmitting the response frame to the initiator.

F. 1. Here, the sensing request frame transmitted by the sensing initiator STA (e.g., non-AP STA) may include the following information.

F. 1. i. Sensing measurement request

F. 1. i. 1. The information may be information indicating an operation to perform a sensing measurement and requesting the AP to perform a sensing operation.

F. 1. ii. Sensing proxy operation request F. 1. ii. 1. The information may be information requesting that the AP perform a sensing operation on behalf of a non-AP STA as an initiator.

F. 1. iii. Sensing priority information

F. 1. iii. 1. It indicates the priority information for the sensing measurement, which may be set according to the sensing scenario and/or sensing accuracy.

F. 1. iii. 2. The information may be configured as, for example, 1/2 bit.

F. 1. iii. 2. A. If it is set to 1 bit, it may indicate immediate or not immediate.

F. 1. iii. 2. b. When set to 2 bits, it indicates the priority for sensing accuracy or latency, for example, and may be indicated as high/normal/low.

F. 1. iv. Measurement period

F. 1. iv. 1. It may refer to information about how often the measurement is performed.

F. 1. iv. 2. The period information may correspond to a feedback transmission period.

F. 1. v. Max duration for Measurement

F. 1. v. 1. It may refer to the maximum time information for the cycle in which the measurement is performed.

F. 1. vi. Feedback report period

F. 1. vi. 1. It may refer to the periodicity of sending feedback information on measured sensing information.

F. 1. vii. Feedback information

F. 1. vii. 1. It may include various information related to receiving feedback. For example, the information may comprise the following information.

F. 1. vii. 1. A. Feedback type, Ng, scaling factor, threshold, and bit size for channel state information (CSI)

Figure 18:
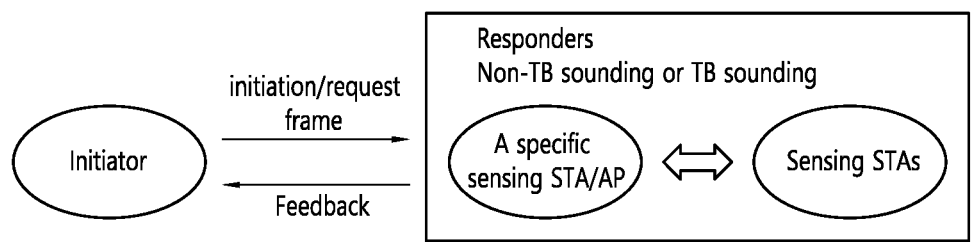
FIG. 18 is an example of an initiator-initiated sensing action flow proposed herein.

F. 2. An example of a sensing operation flow initiated by a Non-AP STA is shown below. FIG. 18 is an example of a sensing operation flow initiated by an initiator proposed in the present specification. The initiator may be a non-AP STA, i.e., the initiator in FIG. 18 may refer to the role of transmitting a sensing initiation/request frame to a specific STA (or AP) to trigger the performance of a sensing measurement procedure by the specific STA (or AP). Thus, the actual sensing measurement request/response procedure may be performed by the specific STA (or AP) and the STA performing the sensing measurement.

Figure 19:
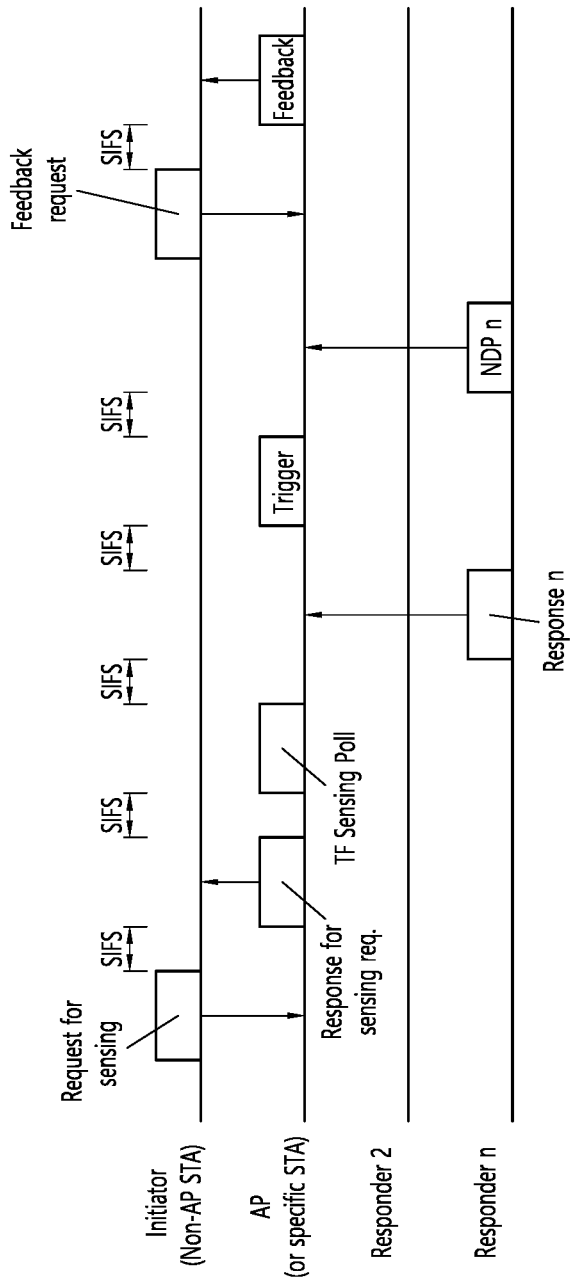
FIG. 19 is an example of a TB sounding case.

As an example of the above flow, the following sensing procedure can be considered for TB sensing measurement. Hereinafter, a TB sounding case is described. FIG. 19 is an example of a TB sounding case. The initiator of FIG. 19 may refer to the initiator of FIG. 18, the AP or specific STA of FIG. 19 may refer to the specific STA (or AP) of FIG. 18, and the responder of FIG. 19 may refer to the STA (sensing STA) that performs the sensing measurement of FIG. 18.

Referring to FIGS. 18 and 19, a non-AP STA may transmit a request frame to an AP requesting the AP to perform a sensing operation or measurement. The non-AP STA transmitting the request frame may be an STA associated with the AP or an un-associated STA. Further, the STA transmitting the request frame may not have an initiator role. In FIGS. 18 and 19, an AP that receives a request frame from a non-AP STA may transmit information about whether to perform a sensing operation or measurement, or whether to act as a proxy, to the non-AP STA using a response frame.

When performing a sensing measurement, the AP may determine which STAs are participating in the sensing through sensing polling. In this case, the AP may trigger an NDP frame by sending a trigger frame to the STA that transmitted the response (e.g., CTS) to the sensing poll. The NDP frame may be transmitted over the time/frequency resource allocated via the trigger frame. At this time, the AP may obtain CSI information by measuring the NDP frames received from each STA.

The non-AP STA that initiated or triggered the sensing operation may transmit a feedback request frame to the AP to receive CSI information or sensing measurement feedback information measured by the AP. In this case, the feedback request frame transmitted by the non-AP STA to the AP may include a report control field. This field may include the following information:

1. Type of CSI
2. Nss: Nss used to transmit feedback
3. Bit size for the CSI
4. Scaling factor for the CSI or quantization value for the CSI
5. RU allocation, which includes preamble puncturing
6. MCS
7. Coding: BCC or LDPC Notwithstanding the foregoing, the AP may feedback only the sensing results from the measurement information to the non-AP STA. For example, when performing intrusion detection, only the sensing results of presence or absence of movement may be returned via feedback.

Figure 20:
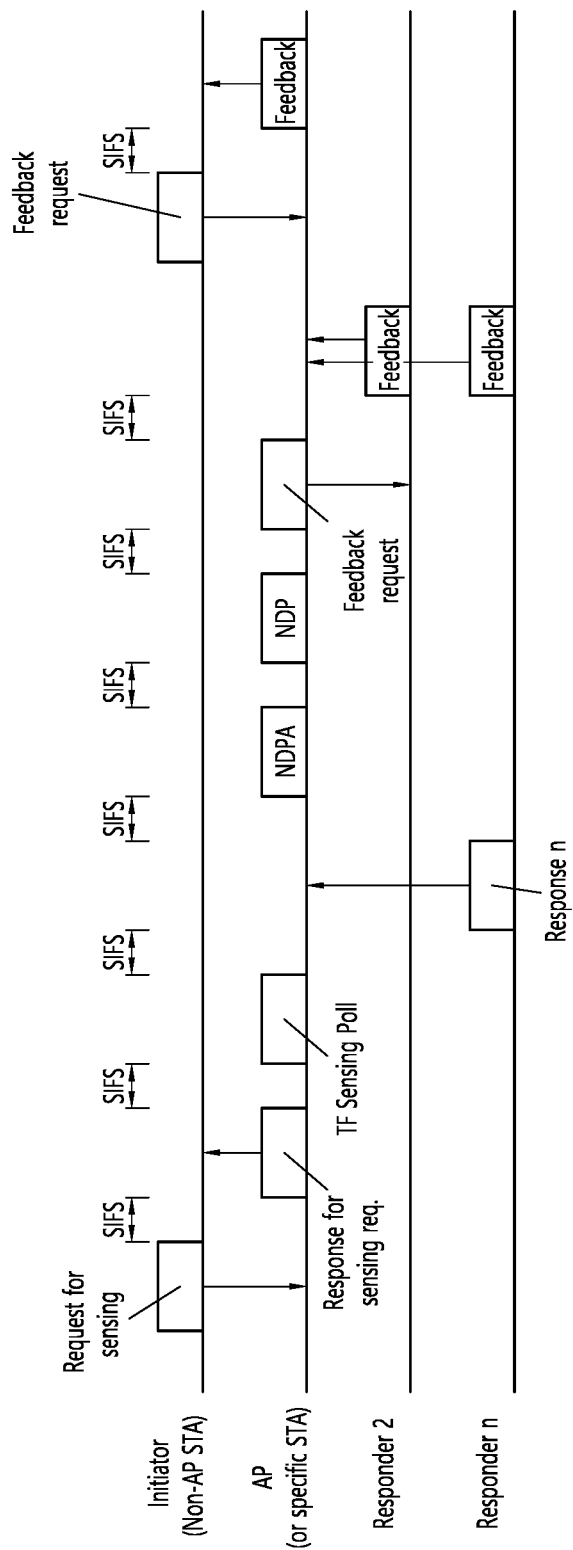
FIG. 20 is an example of an NDPA sounding case.

Hereinafter, the NDPA sounding case is described. FIG. 20 is an example of an NDPA sounding case. The initiator of FIG. 20 may refer to the initiator of FIG. 18, the AP or specific STA of FIG. 20 may refer to the specific STA (or AP) of FIG. 18, and the responder of FIG. 20 may refer to the STA (sensing STA) that performs the sensing measurement of FIG. 18.

Referring to FIG. 20, a non-AP STA may transmit a request frame to an AP requesting the AP to perform a sensing operation or measurement. The non-AP STA transmitting the request frame may be an associated STA or an un-associated STA with the AP. Further, the STA transmitting the request frame may not have an initiator role. In FIG. 20, an AP that receives a request frame from a non-AP STA may transmit information to the non-AP STA in a response frame about whether to perform a sensing operation or measurement, or whether to act as a proxy, to the non-AP STA.

When performing a sensing measurement, the AP may use a sensing polling to determine which STAs are participating in the sensing. At this time, the AP may transmit NDPAs and NDP frames for STAs that have transmitted a response (e.g., CTS) to the sensing poll. After the NDP transmission, the AP may transmit feedback request frames to each STA to receive feedback on the channel information or CSI measured by each STA. In FIG. 20, transmitting a feedback request frame after the SIFS elapses after the NDP transmission is an example, and the feedback request frame may be transmitted based on an IFS or contention that is longer than the SIFS. A trigger frame may be used as the feedback request frame. In this case, the feedback request frame may include information for each STA to transmit feedback information. The feedback information transmitted via the above feedback request frame may be configured identically except for the RU assignment and STA-ID assigned to transmit the feedback. That is, the STA information field may consist of only the STA-ID and RU assignment fields.

A non-AP STA that initiates or triggers a sensing operation may transmit a feedback request frame to the AP to receive CSI information or sensing measurement feedback information measured by the AP. In this case, the feedback request frame transmitted by the non-AP STA to the AP may include reporting control fields. This field may be configured to include the following information:
1. CSI type
2. Nss: Nss used to transmit feedback
3. Bit size for the CSI
4. Scaling factor for the CSI or quantization value for the CSI
5. RU allocation, which includes preamble puncturing
6. MCS
7. Coding: BCC or LDPC Notwithstanding the foregoing, the AP may only feedback sensing results from the measurement information to the non-AP STA. For example, when performing intrusion detection, only the sensing results of presence or absence of movement may be reported via the feedback.

Figure 21:
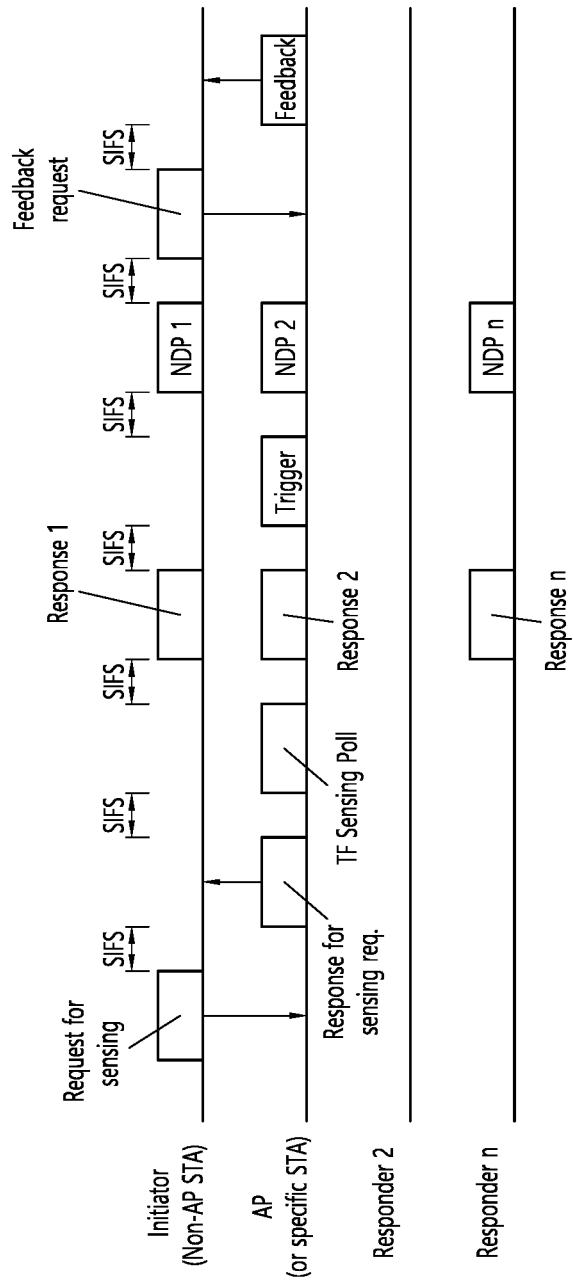
FIG. 21 is an example of a sensing procedure for an STA with initiator and transmitter roles.
Figure 22:
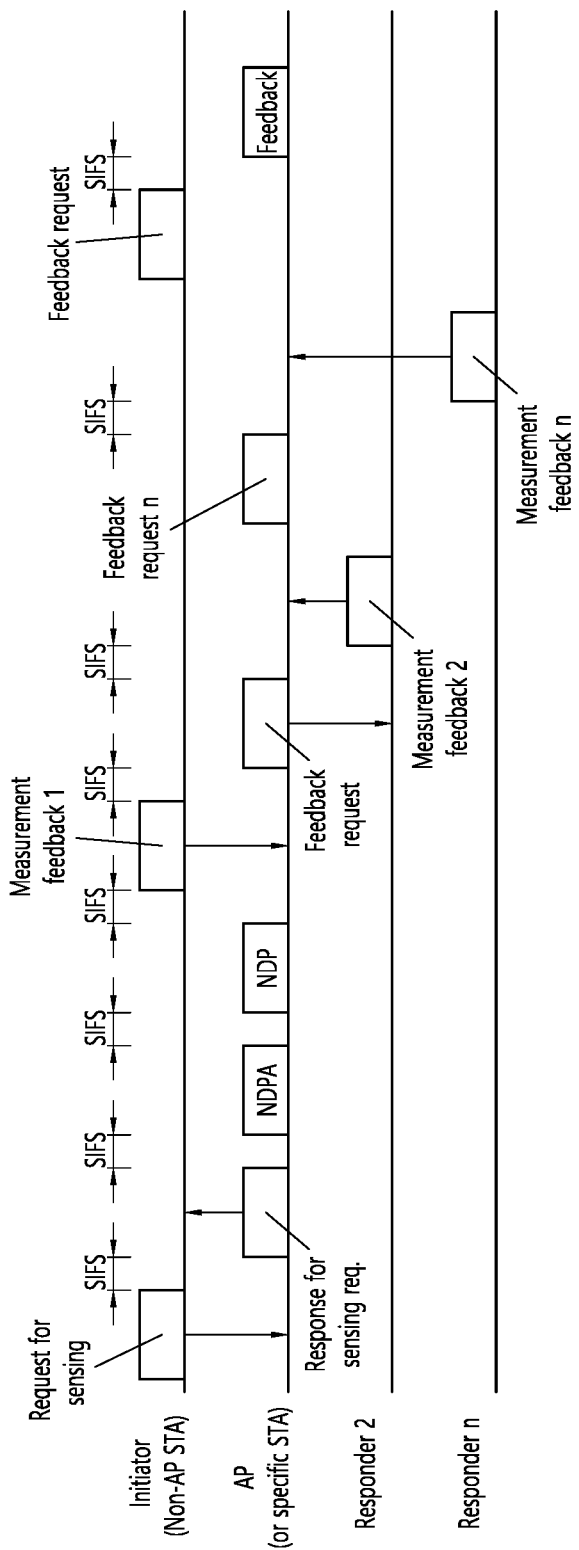
FIG. 22 is an example of a non-TB sounding sequence of an STA with initiator and receiver roles.

As an alternative example to the above, it may be considered that an initiator initiates a sensing and then acts as a sensing responder. That is, if the initiator is a non-AP STA and the AP acts as a sensing responder, the non-AP STA may transmit a signal to the AP (the sensing responder or a specific sensing responder) to initiate sensing. An AP that receives a sensing initiation frame from an initiator may perform channel measurements after transmitting a response frame to the frame to the initiator.
1. The sensing request frame transmitted by the initiator may comprise the following information:
1. A. TXOP information
1. A. i. The information may be information about the duration for which sensing is performed based on the initiator's TXOP information.
1. B. Sensing Responder Information
1. B. i. The information may be configured to be STA-ID information of STAs participating in the sensing.
1. B. i. 1. The information about the sensing STAs may include the STA-ID of the initiator.
1. B. ii. Unlike the above, it may include a sensing group ID instead of individual ID information.
1. C. Sensing operation information
1. C. i. Sensing burst information: It may include the number of bursts, burst duration, etc.
1. D. Sensing request indication: An indicator that requests a sensing operation to be performed.
2. Upon receiving a response frame to a sensing request from a specific responder (e.g., AP), the initiator may participate in channel measurement by the AP and perform the measurement process.
2. A. During the measurement process, the initiating STA may act as a responder. 2. B. The measurement process may be performed using the sounding sequence for measurement proposed in the present specification. In addition, the measured feedback may be reported for channel soundings that require feedback.
2. C. The measurement may be performed by the initiator acting as a transmitter/receiver as follows.
2. C. i. For the initiator and transmitter roles. FIG. 21 is an example of a sensing procedure of an STA having an initiator and a transmitter role. The initiator of FIG. 21 may refer to the initiator of FIG. 18, the AP or specific STA of FIG. 21 may refer to the specific STA (or AP) of FIG. 18, and the responder of FIG. 21 may refer to the STA performing the sensing measurement of FIG. 18 (the sensing STA). On the other hand, the initiator of FIG. 21 may simultaneously perform the role of a sensing STA.
2. C. i. 1. The initiator may act as a transmitter for transmitting NDP after initiating sensing.
2. C. i. 2. Upon receiving an NDP transmission request frame from the AP (i.e., a trigger frame for NDP transmission is transmitted to the sensing STA), the initiator and other sensing responders may use the received frame information to transmit NDP frames to the AP.
2. C. i. 2. A. The trigger frame for the above NDP transmission request may contain the following information:
2. C. i. 2. A. i. STA-ID
2. C. i. 2. A. ii. RU assignment or assigned subchannel information
2. C. i. 2. A. iii. Number of spatial streams (Nss) for each STA
2. C. i. 2. A. iv. Number of LTFs or repetitions of LTFs
2. C. i. 2. A. v. Size of LTFs
2. C. i. 2. A. vi. Dialog token information/measurement identifier
2. C. i. 2. A. vi. 1. The trigger frame is transmitted including a measurement identifier, the information may be configured to be sounding/sensing dialog token information.
2. C. i. 2. A. vi. 2. The above identifier may be used as a sensing measurement ID or a sensing measurement setup ID or a measurement ID.
2. C. i. 3. The AP receiving the NDP from the sensing STAs may use the received NDP to measure the channel information between each STA and the AP. After receipt of the feedback request frame sent by the initiator after the SIFS lapse following receipt of the NDP, the above channel information may be transmitted to the initiator.
2. C. i. 3. A. The feedback request frame and the feedback frame may include the dialog token information or the measurement identifier received via the trigger frame.
2. C. ii. For the initiator and receiver roles.
2. C. ii. 1. Non-TB sounding sequence. FIG. 22 is an example of a non-TB sounding sequence for an STA with initiator and receiver roles. The initiator of FIG. 22 may refer to the initiator of FIG. 18, the AP or specific STA of FIG. 22 may refer to the specific STA (or AP) of FIG. 18, and the responder of FIG. 22 may refer to the STA performing the sensing measurement of FIG. 18 (the sensing STA). On the other hand, the initiator of FIG. 22 may simultaneously perform the role of a sensing STA.
2. C. ii. 1. A. The initiator may act as a receiver for receiving NDPs after initiating sensing.
2. C. ii. 1. B. The AP may perform the above non-TB sounding sequence.

2. c. ii. 1. c. After SIFS following the AP's NDP transmission, the initiator may feedback the measured channel measurement information to the AP (responder_1 in FIG. 22).
2. c. ii. 1. c. i. Here, the initiator may not feedback the measured channel information to the AP because all channel information is feedback to the initiator by the AP.

In FIG. 22, the initiator does not feedback the measurement information and the sensing STAs that receive the NDP from the AP may perform feedback at SIFS intervals.

Figure 23:
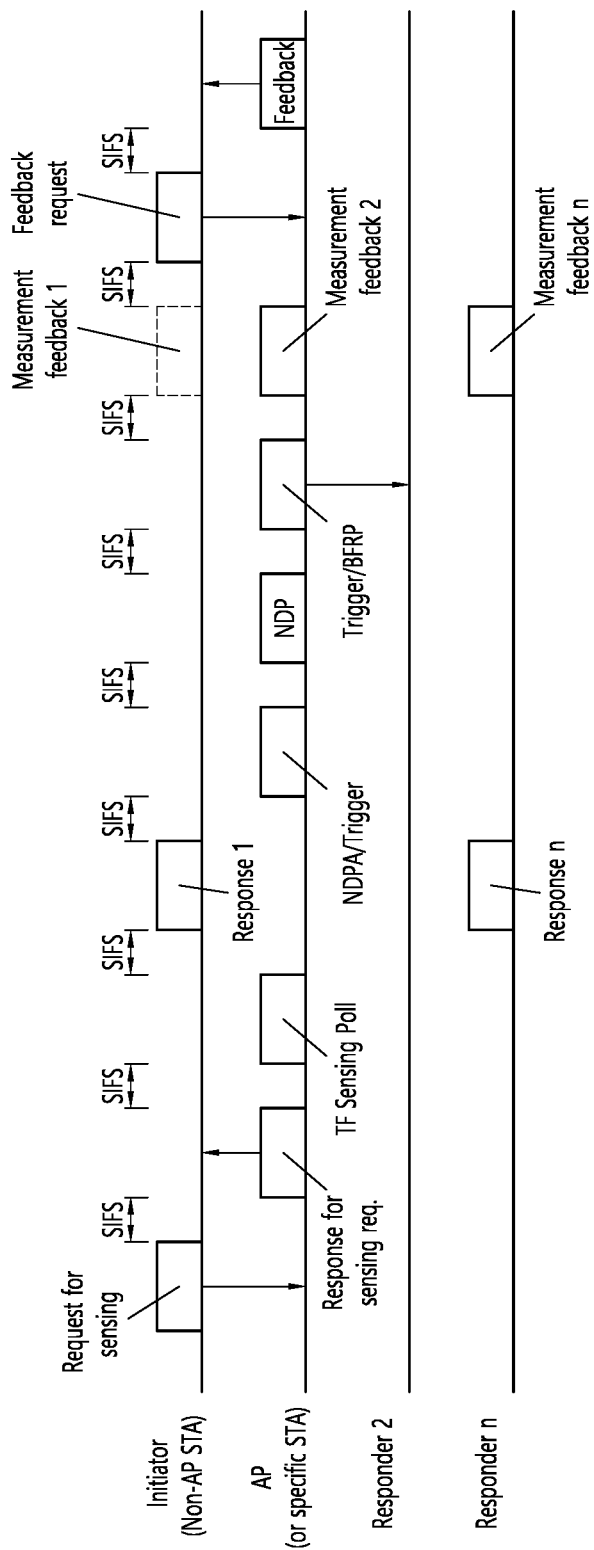
FIG. 23 is an example of a TB sounding sequence of an STA with initiator and receiver roles.

2. C. ii. 1. D. The AP may transmit channel information to the initiator after receiving a trigger or query frame for a feedback request from the initiator.
2. C. ii. 1. D. i. In FIG. 22, the feedback request frame may be transmitted after the SIFS from the last feedback transmitted by the sensing STA to the AP.
2. C. ii. 1. D. ii. After SIFS has elapsed since the frame was received, the AP may transmit feedback information to the initiator STA.
2. C. ii. 2. TB sounding sequence. FIG. 23 is an example of a TB sounding sequence of an STA having an initiator role and a receiver role. The initiator of FIG. 23 may refer to the initiator of FIG. 18, the AP or specific STA of FIG. 23 may refer to the specific STA (or AP) of FIG. 18, and the responder of FIG. 23 may refer to the STA performing the sensing measurement of FIG. 18 (the sensing STA). On the other hand, the initiator of FIG. 23 may simultaneously perform the role of a sensing STA.
2. c. ii. 2. A. The initiator may act as a receiver for receiving NDPs after initiating sensing.
2. C. ii. 2. B. The AP (responder 1) may perform the TB sounding sequence described above.
2. C. ii. 2. C. The AP (responder 1) may transmit feedback request frames to obtain channel measurement information after transmitting NDPA and NDP frames to the initiator and sensing responders.
2. C. ii. 2. C. i. The above feedback request frame may be transmitted after SIFS has elapsed since the NDP transmission.
2. C. ii. 2. C. ii. The feedback request frame may not contain any information from the initiator.
2. C. ii. 2. d. The AP (responder 1) may transmit channel information to the initiator after receiving a trigger or query frame for a feedback request from the initiator.
2. C. ii. 2. D. i. In FIG. 23, the feedback request frame may be transmitted after SIFS has elapsed since the feedback transmission from the sensing STA to the AP.
2. C. ii. E. After SIFS has elapsed since receipt of the frame, the AP may transmit feedback information to the initiator STA.

Figure 24:
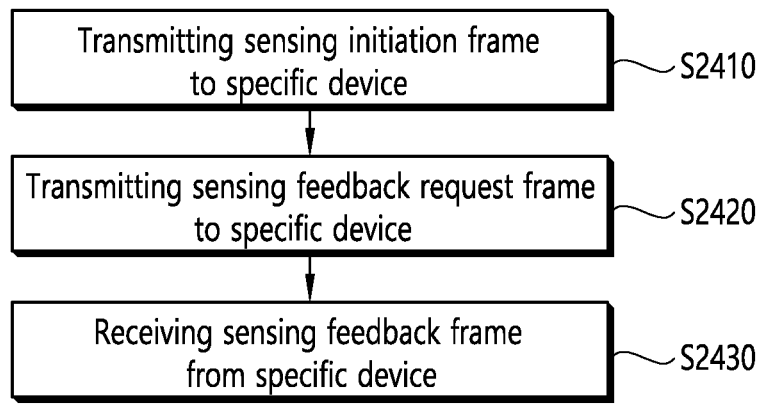
FIG. 24 is a flowchart of an example of a method performed by an initiation device.

The following describes a method performed by an initiation device (the initiator) according to some implementations of the present disclosure. FIG. 24 is a flowchart of an example of a method performed by an initiation device. Here, the initiation device may be a non-AP STA.

Referring to FIG. 24, the initiation device transmits a sensing initiation frame to a specific device (the specific STA) in S2410. Here, the sensing initiation frame may be a frame requesting a sensing operation, such as a sensing measurement, for the specific device. Further, the specific device may be an owner, i.e., a device/STA that transmits a trigger frame or an NDP frame for a sensing measurement to a sensing device, and receives a frame containing the result of the sensing measurement from the sensing device. The specific device may be the AP or the non-AP STA. Also, although not shown in FIG. 24, the initiation device may receive a sensing response frame in response to the sensing initiation frame from the specific device.

The initiation device transmits a sensing feedback request frame to the specific device (S2420). In response to the sensing feedback request frame, the initiation device receives a sensing feedback frame from the specific device (S2430). Here, the sensing feedback frame may include information related to a result of the sensing measurement obtained/received by the specific device. For example, information about the result of the sensing measurement may be received by the specific device from the sensing device.

Although not shown in FIG. 24, the sensing device may be a device that has transmitted a response frame to the specific device in response to a sensing poll frame transmitted by the specific device. Examples of the above procedure can be found in FIGS. 16, 17, 19 through 21, and 23. Here, the response frame to the sensing poll frame may be a CTS frame.

Further, the sensing feedback frame may include a sensing measurement result transmitted by the sensing device. Here, an example of the sensing measurement result may be as shown in FIG. 4.

Further, the specific device may be determined based on request information from the initiation device. For example, the specific device may be a device/STA that transmits response information to the initiation device in response to the request information transmitted by the initiation device. Here, the procedure for transmitting and receiving the request information and the response information may be performed only when the specific device is a non-AP STA, that is, the procedure for transmitting and receiving the request information and the response information may be omitted when the specific device is an AP. For example, an AP that receives the request information may initiate a sensing measurement procedure without transmitting the response information. Further, the response information may be included in the sensing initiation frame, or may be included in a separate frame other than the sensing initiation frame.

Figure 25:
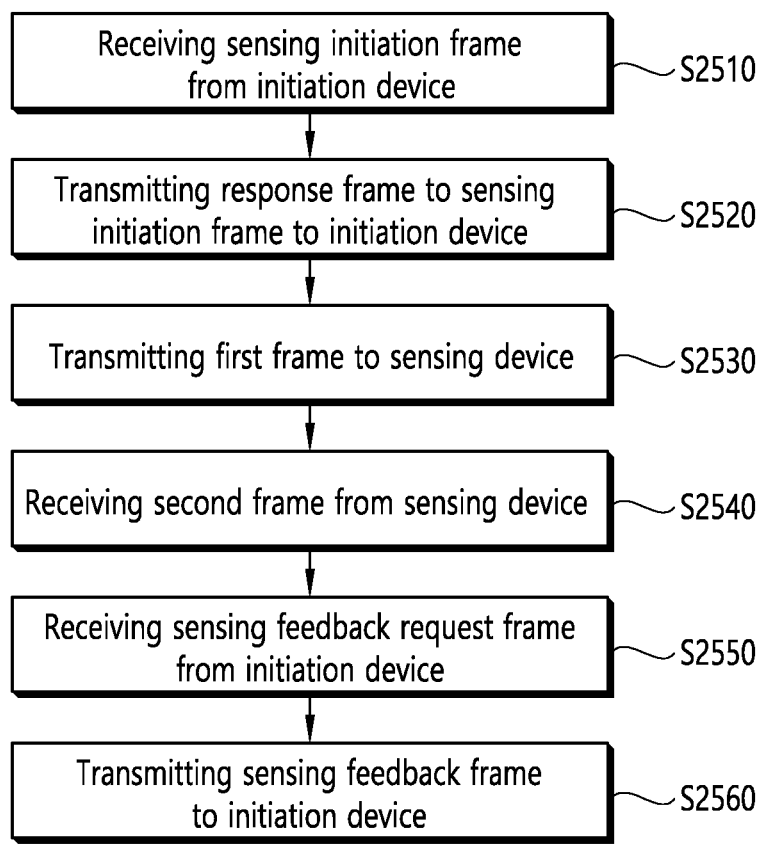
FIG. 25 is a flowchart of an example of a method performed by a specific device.

FIG. 25 is a flowchart of an example of a method performed by a specific device. Here, the specific device may be a non-AP STA or an AP.

Referring to FIG. 25, the specific device receives a sensing initiation frame from the initiation device (the initiator) in S2510. Here, the sensing initiation frame may be a frame requesting a sensing operation, such as a sensing measurement, for the specific device. Also, although not shown in FIG. 25, the specific device may transmit a sensing response frame to the initiation device in response to the sensing initiation frame.

In S2520, the specific device transmits a response frame to the sensing initiation frame to the initiation device. Here, the response frame may include acceptance information for the sensing operation.

The specific device transmits a first frame to the sensing device (S2530). Further, the specific device receives a second frame from the sensing device (S2540). Here, as in the example of FIG. 24, the sensing device may be a device that has transmitted a response frame to the specific device in response to a sensing poll frame transmitted by the specific device.

Here, with reference to FIG. 19 or FIG. 21, the first frame may be a trigger frame. In this case, the second frame may be an NDP frame. The NDP frame may be a frame that is triggered based on the trigger frame. In this case, the specific device may perform a sensing measurement based on the NDP frame.

Alternatively, referring to FIG. 20 or FIG. 22, the first frame may be an NDPA frame. In this case, after transmitting the NDPA frame, the specific device may transmit an NDP frame to the sensing device. Alternatively, referring to FIG. 20 or FIG. 22, the first frame may be an NDP frame. In this case, prior to transmitting the NDP frame, the specific device may transmit an NDPA frame to the sensing device. The second frame may be a measurement feedback frame for the NDP frame. In this case, the measurement feedback frame may comprise a result of a sensing measurement performed by the sensing device based on the NDP frame. Here, an example of the sensing measurement result may be shown in FIG. 4.

The specific device receives a sensing feedback request frame from the initiation device (S2550). In response to the sensing feedback request frame, the specific device transmits a sensing feedback frame to the initiation device (S2560).

Here, referring to FIG. 19 or FIG. 21, the sensing feedback frame may include a result of a sensing measurement performed by the specific device based on the NDP frame received from the sensing device. In the case of a plurality of the sensing devices, the sensing feedback frame may include all or part of the results of a sensing measurement performed by the specific device based on a plurality of NDP frames received from the plurality of sensing devices.

Alternatively, referring to FIG. 20 or FIG. 22, the sensing feedback frame may include information about the results of the sensing measurement received by the specific device from the sensing device. Here, if the sensing device is plural, the sensing feedback frame may include all or part of the information about the sensing measurement results received by the plurality of sensing devices.

Although not shown in FIG. 25, the sensing device may be a device that has transmitted a response frame to the specific device in response to a sensing poll frame transmitted by the specific device. The procedure may refer to the procedure of FIG. 16, FIG. 17, FIG. 19 through FIG. 21, and FIG. 23. Here, the response frame to the sensing poll frame may be a CTS frame.

Also, for example, in FIG. 25, the trigger frame or NDPA frame transmitted in the first frame may include a sounding dialog token field. Here, the sounding dialog token field may be used as an identifier to identify an object/type/information of a sensing measurement. For example, the specific device receiving the second frame from the sensing device may include a sensing measurement result/information, etc. corresponding to the sounding dialog token field.

Further, as described above, a measurement ID or a measurement instant ID herein may be replaced by a measurement instance ID. Here, the measurement instance ID may be an identifier used to identify various phases of a WLAN sensing procedure. For example, the phases may include a polling phase, an NDPA sounding phase, a TF sounding phase, a reporting phase, a non-TB sensing measurement instance, and the like. Referring to FIGS. 24 and 25, the sounding dialog token field may be used for information about the measurement instance ID.

Furthermore, in addition to the frames/information disclosed in FIGS. 24 and 25, embodiments of various frames/information/fields contained in frames proposed herein may be applied to the examples of FIGS. 24 and 25. Accordingly, redundant descriptions are omitted.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method performed in a wireless local area network (LAN) system, the method comprising:
    transmitting, by a non-access point (AP) station (STA), a sensing request frame to an AP STA,
    wherein the sensing request frame includes information requesting the AP to perform a sensing operation;
    receiving, by the non-AP STA, a sensing response frame from the AP STA in response to the sensing request frame; and
    receiving, by the non-AP STA, a sensing report frame from the AP STA,
    wherein the sensing report frame includes a sensing measurement report received by the AP STA which is a sensing initiator, wherein the sensing measurement report is received from at least one STA which is a sensing responder.

2. The method of claim 1, wherein the sensing measurement report includes channel state information between the sensing initiator and the sensing responder.

3. The method of claim 2, wherein the channel state information is measured based on a null data packet (NDP) frame transmitted by the sensing responder,
    wherein the NDP frame is a frame triggered based on a trigger frame transmitted by the sensing initiator.

4. The method of claim 1,
    wherein the sensing report frame includes sounding dialog token information,
    wherein the sounding dialog token information is information for identifying a phase in which the sensing report frame is received.

5. A non-access point (AP) station (STA) in a wireless local area network (LAN) system, the device comprising:
    a memory; and
    a processor operatively connected to the memory,
    wherein the processor is adapted to:
    transmit a sensing request frame to an AP STA,
    wherein the sensing request frame includes information requesting the AP to perform a sensing operation;
    receive a sensing response frame from the AP STA in response to the sensing request frame; and
    receive a sensing report frame from the AP STA, wherein the sensing report frame includes a sensing measurement report received by the AP STA which is a sensing initiator, wherein the sensing measurement report is received from at least one STA which is a sensing responder.

6. The non-AP STA of claim 5, wherein the sensing measurement report includes channel state information between the sensing initiator and the sensing responder.

7. The non-AP STA of claim 6, wherein the channel state information is measured based on a null data packet (NDP) frame transmitted by the sensing responder,
    wherein the NDP frame is a frame triggered based on a trigger frame transmitted by the sensing initiator.

8. The non-AP STA of claim 5,
    wherein the sensing report frame includes sounding dialog token information,
    wherein the sounding dialog token information is information for identifying a phase in which the sensing report frame is received.

* * * * *